(12) United States Patent
Pearce et al.

(10) Patent No.: US 7,474,660 B1
(45) Date of Patent: *Jan. 6, 2009

(54) MAC ADDRESS EXTENSION TO MAINTAIN ROUTER INFORMATION IN SOURCE ROUTED COMPUTER NETWORKS

(75) Inventors: Bernie Paul Pearce, Cary, NC (US); Claude Alan Cartee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,125

(22) Filed: Mar. 31, 1999

(51) Int. Cl.
*H04L 12/28* (2006.01)

(52) U.S. Cl. .................. 370/395.3; 370/395.52; 370/401; 370/409; 370/475; 709/237; 709/242

(58) Field of Classification Search ............... 370/395.3, 370/395.31, 395.5, 395.51, 395.52, 395.65, 370/401, 402, 403, 404, 405, 408, 475; 709/223, 709/224, 225, 237, 311, 331, 332

See application file for complete search history.

(56) References Cited

U.S. PATENT DOCUMENTS

| 4,920,529 | A | * | 4/1990 | Sasaki et al. ............... 370/218 |
| 5,331,637 | A | | 7/1994 | Francis et al. ............... 370/54 |
| 5,353,283 | A | | 10/1994 | Tsuchiya ..................... 370/60 |
| 5,442,633 | A | | 8/1995 | Perkins et al. ............. 370/94.1 |
| 5,583,996 | A | | 12/1996 | Tsuchiya ............... 395/200.15 |
| 5,600,644 | A | | 2/1997 | Chang et al. ................ 370/404 |
| 5,633,866 | A | | 5/1997 | Callon ....................... 370/397 |
| 5,781,552 | A | * | 7/1998 | Hashimoto .................. 370/447 |
| 5,815,668 | A | * | 9/1998 | Hashimoto .................. 370/401 |

(Continued)

OTHER PUBLICATIONS

Perlman, Radia, *Interconnections*, Bridges and Routers, 1992, pp. 1-8; 31-33; 99-125 and 149-164.

(Continued)

*Primary Examiner*—Chi H. Pham
*Assistant Examiner*—Shick Hom
(74) *Attorney, Agent, or Firm*—Cesari and McKenna LLP

(57) ABSTRACT

The invention solves the problem of maintaining Route information Field (RIF) information in a router for populating the RIF field of packets routed by the router, by storing the RIF information with the Layer 2 address in the address binding table. The address binding table establishes a binding between a Layer 2 address and a Layer 3 address of a station. The Layer 2 address in the address binding table is extended to include the RIF information. The address binding table is normally maintained in the router in an architecture which permits rapid access for fast switching such as cut through routing. A separate RIF cache table, requiring a separate time consuming table look-up is thereby avoided. The address binding table is referred to as the Address Resolution Protocol (ARP) Table in IP protocol. The Layer 2 address is extended to include both MAC address and REF information. The RIF information in the Layer 2 field of the ARP table is updated in response to execution of an ARP Explorer protocol by the router. RIF information is read from an ARP Explorer response packet and written into the Layer 2 field of the ARP table. The Layer 2 address, both MAC address and RIF information, is read from the ARP table for use in populating both the destination address field and the RIF field of a routed packet.

22 Claims, 12 Drawing Sheets

U.S. PATENT DOCUMENTS

| | | | | |
|---|---|---|---|---|
| 5,818,842 | A | | 10/1998 | Burwell et al. ............... 370/397 |
| 5,828,844 | A | | 10/1998 | Civanlar et al. ......... 395/200.58 |
| 5,835,720 | A | * | 11/1998 | Nelson et al. ................ 709/224 |
| 5,898,686 | A | | 4/1999 | Virgile ........................ 370/381 |
| 5,909,441 | A | | 6/1999 | Alexander, Jr. et al. ..... 370/395 |
| 5,909,550 | A | | 6/1999 | Shankar et al. ......... 395/200.57 |
| 5,949,786 | A | * | 9/1999 | Bellenger ................... 370/401 |
| 5,999,536 | A | * | 12/1999 | Kawafuji et al. ............. 370/401 |
| 6,198,747 | B1 | * | 3/2001 | Bingham et al. ............ 370/401 |
| 6,269,398 | B1 | * | 7/2001 | Leong et al. ................ 709/224 |
| 6,272,150 | B1 | * | 8/2001 | Hrastar et al. ............... 370/486 |
| 6,424,658 | B1 | * | 7/2002 | Mathur ........................ 370/429 |
| 6,434,627 | B1 | * | 8/2002 | Millet et al. ................ 709/245 |
| 6,556,574 | B1 | * | 4/2003 | Pearce et al. ................ 370/401 |

OTHER PUBLICATIONS

Tanenbaum, Andrew, *Computer Networks*, Third Edition, Prentice Hall, 1996, pp. 28-35 and 420-242.

Comer, Douglas E., *Computer Networks and Internets*, Prentice Hall, 1997, Chapter 18, pp. 239-249.

Comer, Douglas E., *Internetworking with TCP/IP*, vol. 1, Third Edition, Prentice Hall, 1995, pp. 89-107.

Comer, E and Stevens, David L., *Internetworking with TCP/IP*, vol. 2, Design Implementation, and Internal, Prentice Hall, 1991, pp. 37-58.

Postel, J., "Internet Protocol—DARPA Internet Program Protocol Specification," RFC 791, USC/Information Sciences Institute, Sep. 1981.

Postel, J., "Transmission Control Protocol—DARPA Internet Program Protocol Specification," RFC 793, USC/Information Sciences Institute, Sep. 1981.

Braden, R., "Requirements for Internet Hosts—Communication Layers," RFC 1122, USC/Information Sciences Institute, Oct. 1989.

Lewis, Chris, *Cisco TCP/IP Routing Professional Reference*, McGraw Hill, 1998, pp. 188-205.

International Business Business Corporation, *Token-Ring Network*, MAC Frame Format, Chapter 2, pp. 2-1, 2-12, 1986.

* cited by examiner

IEEE 802.5: Level 2 MAC Frame Fields

IEEE 802.2 LLC Fields

IEEE 802.2 LLC Fields using SNAP SAP option

RIF Field 10,000

ARP Table

| | MAC Address | RIF Information | IP Address | Creation Time | Other Information | |
|---|---|---|---|---|---|---|
| ESP1, Route | | | | | | 10,002 |
| ESP2, Route | | | | | | 10,004 |
| ESP3, Route | | | | | | 10,006 |
| etc. | | | | | | 10,008 |
| etc. | | | | | | |
| | | | | | | |
| ESPn, Route | | | | | | 10,010 |

Columns: 902, 904, 906, 908, 910

Fig. 10

MAC ADDRESS EXTENSION TO MAINTAIN ROUTER INFORMATION IN SOURCE ROUTED COMPUTER NETWORKS

RELATED CASES

This patent application is related to a patent application filed by Pearce, et al. titled "Duplicate Ignore Delay Timer for ARP Like Protocol Messages using A Protocol", U.S. patent application Ser. No. 09/283,124, filed on even date with this patent application.

FIELD OF THE INVENTION

This invention relates to operation of routers in computer networks, and more particularly to routing packets over networks using source routing protocols.

BACKGROUND

A computer network comprises, in the simplest instance, a plurality of computers connected together by a communications media so that the computers can exchange messages. The computers are usually referred to as "stations".

In an exemplary embodiment, the communications media is arranged as a continuous ring and the stations are attached to the ring. This embodiment is referred to as a "token ring" local area network. The stations pass a special control message referred to as a "token" around the ring from one station to the next, and the station which holds the token transmits its messages onto the ring. When it is finished, the station transfers the token to the next station on the ring.

In an alternative exemplary embodiment, a local area network may implement the Ethernet protocol, or the closely related IEEE 802.3 Standard protocol. In an Ethernet system all terminals are connected to a common bus. Any station can transmit when it determines that the bus is free, and if a collision of packets is detected on the bus, then the stations quit transmitting and back off for a "backoff time interval", and then try again. Other alternative network hardware technologies requiring routing information comprise FDDI token ring, ATM networks, etc.

The present discussion will focus particularly on token ring local area networks and their interconnection into larger networks.

A more complex token ring computer network comprises several token rings connected together by specialized stations referred to as "bridges". A message originating at a source station on one token ring can reach a destination station on another token ring by passing through one or more bridges, where the specialized job of the bridges is to forward messages from one token ring to another. In an exemplary embodiment, there may be a plurality of bridges between a first token ring and a second token ring. And the path which the message takes from a source station on a source token ring may pass through several intermediate token rings, before reaching the destination station on the destination token ring. Further, with a plurality of bridges between each pair of a plurality of token rings, there are many paths through token rings and bridges which the message can take from the source station and the destination station.

In an exemplary embodiment of computer networks, referred to as "source route bridge (SRB) networks", the source station puts a specification of the path into the message. The specification is placed in the Route Information Field, the RIF, of the message. The RIF determines the path that the message is to follow through the bridges and token rings as it travels from the source station to the destination station. The RIF is placed by the source station into a header of the message. The bridges read the header and forward the message in accordance with the RIF specification.

A router is another specialized station which enables joining many computer networks together. For example, a router can join several computer networks formed from token rings and bridges. Also a router can join a token ring network to an Ethernet network, an FDDI network, etc., a telephone line or a telephone like line, etc. to form a Wide Area Network (WAN). The parts of a WAN may be widely separated, and joined by the telephone like line.

Routers are used to implement hierarchical addressing. Hierarchical addressing commonly uses a two level addressing method. A first level corresponds to Layer 2 of the OSI communications model, and a second level corresponds to Layer 3 of the OSI communications model. Hierarchical addressing permits Layer 3 to be independent of the communications media. The OSI model Layer 2 depends upon the communications media, the Layer 2 hardware technology (such as token ring, Ethernet, etc.), and other Layer 1 and Layer 2 details. Accordingly, a programmer can write code to implement Layer 3 functions without having concern for media dependent details which are handled by Layer 2 functions.

Hierarchical addressing is important in the construction of large networks, for example networks having many thousands of stations, by permitting a single computer to maintain a table of network addresses without having to keep a table giving the physical address of each individual computer on an entire network (for example, the Internet). A packet is sent to a router on the designated destination network, and that router keeps a table of the Layer 2 address of computers on the destination network. Without hierarchical addressing each router would have to keep tables of the Layer 2 addresses of all computers on the entire network, rather than simply keeping a network address referring to the computers on that particular network, and there are many fewer networks than there are computers. Radia Perlman treats hierarchical addressing in her book *Interconnections, Bridges and Routers*, published by Addison Wesley Publishing Company, in 1992, all disclosures of which are incorporated herein by reference, particularly in Chapter 6, pages 149-164.

Commonly used terminology refers to a small local area network as a "subnet". For example, a plurality of token rings joined by bridges is a subnet. Also an Ethernet with one bus, or with several buses joined by bridges, is a subnet. A "network" then refers to several subnets joined by a router. A router or a bridge can be connected to a telephone type line and join subnets in distant cities. For example, a bridge may forward frames using Data Link Switching to interconnect subnets in distant cities. A "wide area network" (WAN) refers to subnets joined by routers or bridges, with the subnets typically being widely separated, for example, in different cities.

Each station has a physical address, also referred to as the MAC address, and the physical address is the OSI model Layer 2 address. The Layer 2 address is also referred to as the "Link Address". Also, each station is assigned a Layer 3 address or network address. For example, in the TCP/IP protocol the Layer 3 (network) address is referred to as the Internet Protocol address, or IP, address. The two levels of hierarchical addressing, the Layer 2 address and Layer 3 address, are typically used in the OSI model to implement subnets and networks. The Layer 3 network address is subdivided into a "specific network address" and a "host address".

The physical address is written into a semi-permanent memory device when the station is manufactured, and is referred to as the "burned in" address. However, the physical address may be changed by the owner of the station, by overriding the burned in address with a locally administered address, referred to as a LAA address.

On a subnet, a message is addressed to both the physical address (Layer 2) and the Network address (Layer 3) of the destination station. A bridge simply forwards the message. In the SRB network embodiment, where the message carries RIF information, the bridge obeys the instructions in the RIF of the message and forwards the message only along the path specified by the RIF.

However, when the source station and the destination station are on different subnets, the message is addressed to the physical address of a router and the Network address of the destination station. The addressed router is a station on the subnet of the source station. The router recognizes its physical address in the message, reads the Network address of the destination station from the header of the message, and then makes a decision as to how to route the message so that it goes to the destination station. The router writes a new header into the packet message before forwarding it onto the next SRB subnet. The new header contains a new RIF. The new RIF directs the message through the token rings and bridges of the new SRB subnet. Alternatively, the new subnet may an Ethernet LAN, and in this case the router builds an Ethernet packet.

In making its decision, the router uses tables which correlate a physical address with a Network address. Also, for SRB subnets, the physical address is correlated with RIF information using a RIF table. The router must first, however, execute a protocol in order to populate its tables. Also, stations on the SRB subnet must know the physical address, the Network address, and the RIF information for a destination station. Thus each station must also go through protocols in order to populate its address tables.

There are a number of protocols used on computer networks for transferring messages from a source station, through intermediate bridges and routers, to a destination station. Names of various protocols comprise: TCP/IP, Apollo, Appletalk, CLNS, DECnet, IPX, Vines, XNS, SNA, and others. The TCP/IP protocol is often used to provide reliable message transport between Layer 3 entities. Under TCP/IP, commonly used protocols and messages for stations, including routers, to populate their tables include an Address Resolution Protocol (ARP) message; an All Routes Explorer (ARE) message; and a Single Route Explorer (SRE) message. These three concepts, ARP messages, ARE messages, and SRE messages, will be explained separately, although they are often combined in one packet, referred to as either an "ARP Explorer (ARE)" packet or an "ARP Explorer (SRE)" packet. The simple term "ARP Explorer" packet is used whenever it can be either an ARE or an SRE type packet. Protocols other than TCP/IP will be discussed hereinbelow.

An ARP message is used by a first station to learn the physical address needed to reach a second station where the first station already knows the Network address of the second station. Often, a source station will know the Network address of an intended destination station, but will not know the physical address needed to reach the destination station. Also, the source station will not know, and does not need to know, the media over which a packet must travel to reach the intended destination station.

In the event that both the first and second stations are on the same subnet, the needed physical address will be the physical address of the second station. However, in the event that the first and second stations are on different subnets, the necessary physical address will be the physical address of a router. Both the subnet of the first station and the remote second station may be the same type of media, for example SRB subnets, or for a further example both may be on Ethernets. Alternatively one subnet may be an SRB subnet and the other a different media technology, for example Ethernet. Once the first station learns both the Network address and the physical address to place in a message, it caches this information in a table referred to as the "ARP table". Protocols other than TCP/IP use "ARP like" tables to provide a binding between a station's physical address and network address.

The example in which both the source subnet and the destination subnet are SRB subnets is next described. An ARP Explorer message is used by the source station to learn the physical address and the route to reach the second station. The ARP Explorer message can be either an all routes explorer (ARP Explorer (ARE)) or a single route explorer (ARP Explorer (SRE)) message. The source station places the Layer 3 Network address of the destination station and a Layer 2 broadcast address in the ARP Explorer message. The ARP Explorer (ARE) message traverses all routes from the source station to the second station and is received by either the intended destination station or a router. In contrast, an ARP Explorer (SRE) explores along the one route designated by a spanning tree.

In a commonly used embodiment one packet, the "ARP Explorer packet", is used with the ARP functionality in Layer 3 fields of the packet, and the ARE functionality in the Layer 2 fields, as described in more detail hereinbelow. The ARP Explorer packet is referred to as a "packet" because it is a message between Layer 3 functions in a source station and in a destination station.

The ARP Explorer packet is forwarded by bridges but is not routed by routers, and so is confined to the subnet of its source station.

The ARE/SRE message protocol gives a source station the SRB route to use to reach the station whose physical address (router or destination station) is needed to reach the destination station. The route information is then stored in the station in a RIF table. The RIF information must be updated frequently, as bridges may become congested, bridges may fail, telephone lines may be cut, etc.

Hereinafter the TCP/IP terminology will be used, and the Network address will be referred to as the IP address. In an ARP Explorer packet the ARP and ARE or SRE protocols are combined, and Layer 3 in the packet controls the ARP functionality and Layer 2 controls the ARE or SRE functionality. The ARP Explorer packet is transmitted onto a SRB subnet by a source station, and the source station may be either a router or an end station. The ARP Explorer packet is confined to the SRB subnet as it is not routed by a router. The ARP Explorer packet is forwarded by all of the bridges in the SRB subnet because of the ARE functionality. However, an SRE type ARP Explorer packet is forwarded only along the spanning tree. A route is built up in the RIF field of the ARP Explorer packet as it is forwarded by various bridges onto various token rings. The ARP Explorer packet is examined by all end stations receiving it by a Layer 3 function to determine if the IP address in the ARP inquiry field matches the receiving station's IP address. In the event that the receiving station finds a match between the IP address in the ARP inquiry field of the ARP Explorer packet and the receiving station's IP address, the receiving station transmits a response packet to the source station. The response packet is directed back to the source station along the route built up in the RIF field of the ARP Explorer packet, but in reverse order.

Build up of the route in the RIF field of the ARP Explorer packet is next discussed in greater detail. The ARE/SRE function in the ARP Explorer packet has the property that when it reaches a bridge on a first token ring, a copy of the ARP Explorer packet is both forwarded by the bridge to the next token ring, and a copy continues around the first token ring. As it is forwarded by a bridge, the ring number of the ring it is going to, along with the bridge number of the forwarding bridge, is written into the RIF of the ARP Explorer packet. The RIF information is built up on a "bridge by bridge" basis as pairs of ring number and bridge number, as the ARP Explorer packet is forwarded throughout the subnet. Further, if the copy of the ARP Explorer packet continuing around the first token ring is received by a second bridge, again a copy is forwarded by the bridge to a token ring (either another token ring or the same "next" token ring if more than one bridge joins the first token ring and the "next" token ring), and also a copy continues around the first token ring. As a result, the destination station receives a plurality of copies of the ARP Explorer packet. And each copy specifies, in the RIF of the ARP Explorer packet, the path taken by that copy through the subnet.

Upon receipt of each copy of the ARP Explorer packet, the destination station having the IP address which is in the IP inquiry field of the ARP Explorer packet then resets a "direction bit" in the RIF of the ARP Explorer packet and re-transmits it onto the subnet as an "ARP Explorer response" message. The "direction bit" is an indicator in the RIF header of the message which specifies whether the path of the RIF is to be traversed from left to right, which takes the message from the source station to the destination station, or from right to left which takes the ARP Explorer response message back to the source station. Each copy of the ARP Explorer packet received by the destination station is thereby converted into an ARP Explorer response message which is received by the source station. Each ARP Explorer response message received by the source station specifies a different path through the subnet to the destination station. The source station then chooses one of the routes to populate its RIF table. One method of choosing the route from the duplicates is to choose the route in the RIF field of the first received ARP Explorer response packet. The source station then uses the RIF value until an event occurs requiring updating of the RIF table: for example, the expiration of a time interval and the transmission of another ARP Explorer packet; or for example, when the source station is a router, the receipt of a packet to be routed to that destination station.

Traditionally, a router may update its ARP table and RIF table upon receipt of an ARP Explorer packet transmitted by an end station. Upon receipt of the ARP Explorer packet, the router transmits an ARP Explorer response message to the end station, just like any other station. Also, the router reads the Layer 3 and the Layer 2 information, including the RIF information, from the ARP Explorer packet and uses it to update its ARP table and RIF table entries.

Another commonly used technique for updating RIF information is for a station to listen to message traffic, and to copy RIF information and physical address from all messages, and use this information to simply overwrite older entries in its RIF table. Particularly, some routers have been designed to listen to message traffic, and to use RIF information and physical addresses read from every message which the router receives, in order to update the entry in the router's RIF table. Update is accomplished by overwriting the current entry in the table.

In the event that a router receives a message having the physical address of the router and the IP address of a station which is not on the subnet from which the message arrives, then the router makes decisions. First the router checks its ARP table to learn if the IP address is in its ARP table by using the IP address as an index into the ARP table. If the IP address is indeed in the ARP table, the router now knows the proper subnet to route the message to, and knows the proper physical address to put in the message (the proper physical address may again be either the destination station or another router). Next, the router checks its RIF table, by using the Layer 2 address as an index into the table, in order to determine if the physical address is in the RIF table, and if it is, the router simply writes the RIF information into the RIF of the message and routes the message on its way. However, in the event that the needed information is not in either the ARP table or the RIF table, the router must transmit an ARP Explorer packet in order to build an entry in its ARP and RIF tables.

One solution to maintaining router tables is to have a central cache for the router table. Accordingly, a central cache for RIF information is maintained as the Router Information Field cache (RIF cache). The central cache model of maintaining RIF information permits any protocol stack (for example, different layer 3 protocols) of the router which receives a packet, to inquire at one location in the router to learn the required RIF information.

However, difficulties with a central RIF cache arise from a number of operations of the router. One difficulty is updating the RIF cache in order to keep it current, and this difficulty is that the RIF cache must be updated by every packet routed by the router. Some packets need to have the RIF cache updated and some do not, however it is time consuming to discriminate between those packets requiring updating of the RIF cache and those not requiring updating. Therefore, in many router internal protocols, the RIF cache is unnecessarily updated by every packet having a RIF field which is received by the router.

An additional difficulty with a central cache for the RIF table in a router is the use of fast switching of messages between SRB subnets. Each fast switching channel in the router may keep a copy of an entry from the central RIF cache so that it can switch packets on a cut-through basis, without spending the time required to perform a look-up in the central RIF cache. The existence of copies of central RIF cache entries creates an update problem, in that whenever the central RIF cache is changed, the corresponding copies in the other areas of the router should be correspondingly changed for each type of protocol supported by the router. It is difficult to update all of the corresponding copies that must be maintained by fast switching elements in the router for all protocol stacks, especially when changes to the central RIF cache are frequently made. Accordingly, the central RIF cache leads to a cache coherency problem with copies of entries made by various functional units of the router.

A better way to maintain RIF table information in a router is needed in order to address the problem of unnecessary updates of the RIF table, along with maintaining currency of all copies made from an entry in a central RIF cache for all of the protocol stacks.

SUMMARY OF THE INVENTION

The invention solves the problem of maintaining RIF information in a router for populating the RIF field of packets routed by the router, by storing the RIF information with the Layer 2 address in the address binding table. The address binding table establishes a binding between a Layer 2 address and a Layer 3 address of a station. The Layer 2 address in the address binding table is extended to include the RIF information. The address binding table is normally maintained in the router in an architecture which permits rapid access for fast switching such as cut through routing. A separate RIF cache table, requiring a separate time consuming table look-up is thereby avoided.

The address binding table is referred to as the ARP Table in IP protocol. The Layer 2 address is extended to include both MAC address and RIF information. The RIF information in the Layer 2 field of the ARP table is updated in response to execution of an ARP Explorer protocol by the router. RIF information is read from an ARP Explorer packet and written into the Layer 2 field of the ARP table. The Layer 2 address, both MAC address and RIF information, is read from the ARP table for use in populating both the destination address field and the RIF field of a routed packet.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 10 is a detailed block diagram of an ARP table in a router in accordance with the invention.

DETAILED DESCRIPTION

First Exemplary Embodiment

Figure 1:
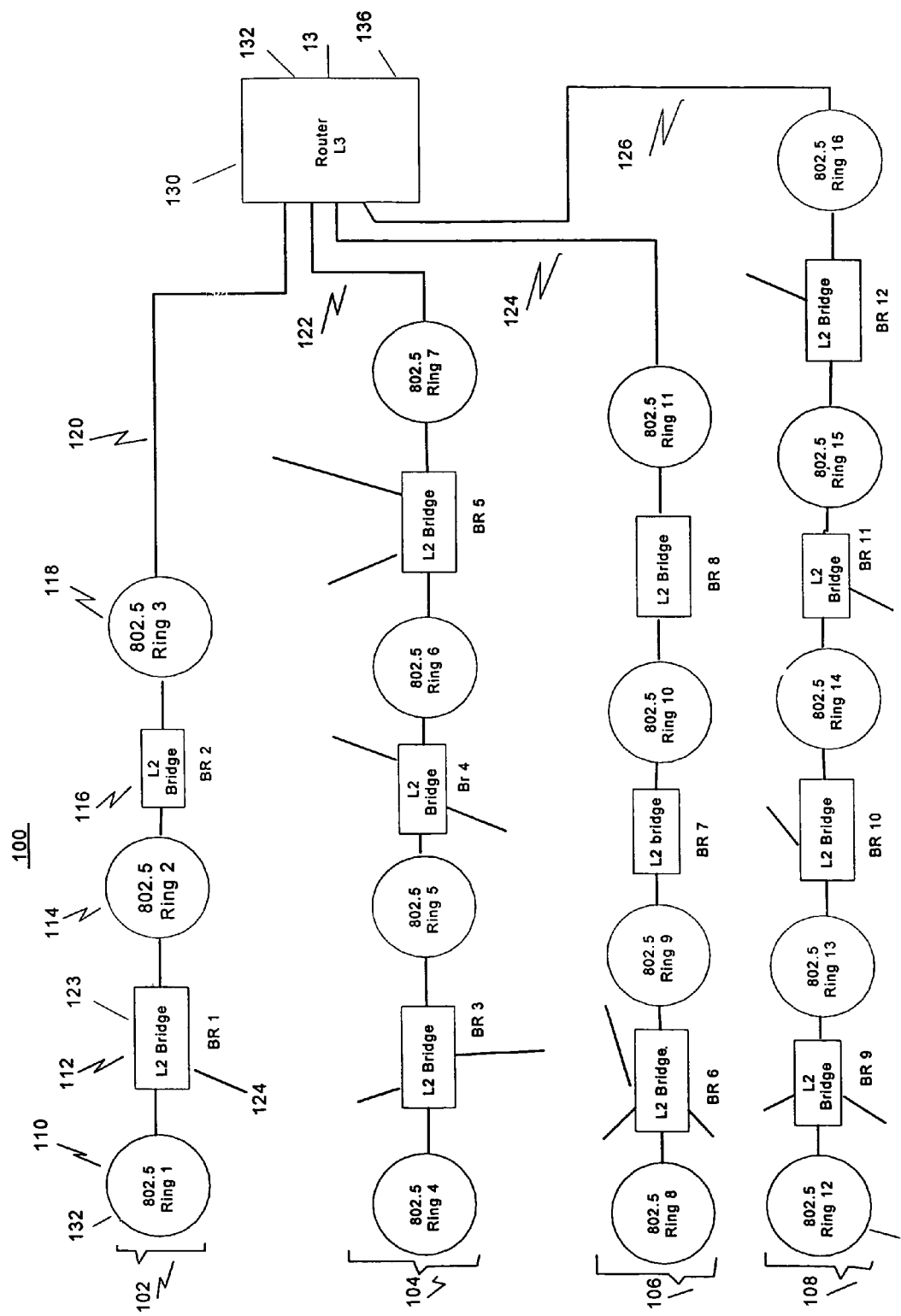
FIG. 1 is a block diagram of a computer network in accordance with the invention.

The First Exemplary Embodiment describes the invention as used in a TCP/IP communications model. Further exemplary embodiments describe the invention as used in other communication protocols, for example in the protocols Apollo, Appletalk, CLNS, DECnet, IPX, Vines, XNS, SNA, and others.

Introduction

Operational functions of a computer network are commonly separated into Layers with interfaces between the Layers. A standard communication model is defined as the Open Systems Interconnection Model (OSI model). The OSI model as set out in the IEEE Standard, IEEE 802 Overview and Architecture, all disclosures of which are incorporated herein by reference, has seven Layers. The OSI model is discussed extensively by Radia Perlman in her book *Interconnections, Bridges and Routers*, at pages 1-8. Another commonly used communications reference model is the Internet Model, or TCP/IP model, and it is described by Andrew Tanenbaum in his book *Computer Networks, Third Edition*, published by Prentice Hall Publishing Company in 1996, all disclosures of which are incorporated herein by reference, particularly at pages 35-44. The Internet Model has five Layers, and is similar to the OSI model except that two seldom used layers are simply omitted in the Internet Model.

When a frame is transmitted onto a computer network which employs source routing protocols such as the IEEE 802.5 token ring protocol, the frame carries in a field, the Routing Information Field (RIF), a specification of the route which the frame will take in moving across the network from its source end station to its intended destination end station. The network is formed from token rings joined by Source Routing Bridges (SRB) operating in Layer 2 of the OSI model of a network communications. A plurality of token ring networks joined by bridges forms a subnet. In particular, the RIF of the frame specifies bridges and token rings which the frame must pass through on its journey through a subnet. A subnet formed by joining token rings by SRB bridges is referred to as an SRB subnet.

The physical address of the destination station (and the source station) is written into outgoing frames and is read from incoming frames by protocol Layer 2 of the standard OSI model. Layer 2 of the OSI model has a lower sublayer referred to as the Media Access Control (MAC) Layer, and has a higher sublayer referred to as the Logical Link Control (LLC) sublayer. The physical address of the destination station is referred to as the Media Access Control (MAC) address, or "MAC address". The "MAC address" of both the source station (source address SA) and the destination station (destination address DA) is written into the MAC header of an outgoing frame by the Layer 2, or MAC Layer, of the protocol in the source station. The destination station reads the DA MAC address from an incoming frame by Layer 2, or MAC Layer, of the protocol in the destination station.

A router operates in Layer 3 of the OSI communications model and joins subnets (for example, SRB subnets, Ethernet subnets, etc.) to form a larger network. The router may also have ports connected to larger Wide Area Networks (WANs), and may use any of several protocols such as SNA, TCP/IP, IPX, frame relay, etc. on these other networks.

Terminology which will be used herein is as follows. At the physical Layer, bits are transmitted by a source station onto the network. A frame is forwarded in a subnet according to the Layer 2 MAC address (the physical address) from a source station to a destination station, and may be forwarded by several bridges. A packet is routed by a router according to a Layer 3 address, and may be routed from a subnet to, for example another subnet, to a wide area network, to a point to point link to another router, etc. Details of addresses used in Layer 3 depend upon the Layer 3 protocol used, and, for example the Layer 3 protocols may comprise IP, Apollo, Appletalk, CLNS, DECnet, IPX, Vines, XNS, SNA, etc. This distinction between a frame and a packet is fully disclosed by Andrew Tanenbaum in his book *Computer Networks, 3rd edition*, published by Prentice Hall Publishing Company in 1996, all disclosures of which are incorporated herein by reference, especially at pages 28-34. Further, the term "message" will be used generally to indicate a transfer of information between computers, and may include a file transfer of many megabytes requiring many packets and many frames, or may refer to a single frame. For example, a single frame may be referred to as a "message", where the single frame carries flow control information upstream to a source station, is an ARP Explorer packet under IP protocol, is an All Routes Explorer frame under IEEE 802.5, is an ARP request frame on an Ethernet network, etc.

The distinction between a frame and a packet has the following addressing characteristics. A frame has the MAC (Layer 2) destination address and the IP (Layer 3) destination address of the same end station, the intended destination end station. The destination end station is either on the same local area network, or the same subnet formed by bridges between local area networks, as the source end station. However, in contrast, a packet has the MAC destination address of a router and the IP address of the intended destination end station on a distant subnet or other network, and the router routes the packet on its journey to the intended destination end station.

After a packet is routed onto a SRB subnet having the destination end station, the packet has both the MAC and IP addresses of the destination end station and so could be referred to as a "frame". However, the packet will still be referred to as a "packet" because it is a message between two Layer 3 entities in the Internet protocol stacks of the source and destination end stations.

Further, a distinction is made between a bridge "forwarding" a frame or packet based upon the MAC Layer 2 address and a router "routing" a packet based upon an IP Layer 3 address. A bridge, which is equivalent to a Layer 2 switch, "forwards" a frame or packet based upon the Layer 2 information in the header of the frame or packet. In contrast, a router, which is equivalent to a Layer 3 switch, routes a packet based upon Layer 3 information (IP address) in the header of the packet.

These terminology choices (message, packet, frame, forward, route, bridge, Layer 2 switch, router, Layer 3 switch, etc.) will be substantially adhered to herein, however deviations from these terminology choices may occasionally be made. A person of ordinary skill in the art of computer networks may easily understand the disclosures herein, even without these terminology choices, and also with occasional deviations from these terminology choices.

In routing a packet from a source SRB subnet to a destination SRB subnet, the router must delete the original Layer 2 header and write a new Layer 2 header before transmitting the packet onto the new SRB subnet. The new Layer 2 header has a new RIF for establishing a route for the packet to take through the new SRB subnet. Accordingly, each router must maintain a table of RIF information for each end station for which it must route frames onto SRB subnets connected to ports of the router. The RIF information maintained by a router is used to populate the RIF of an outgoing packet.

Routers normally update their router tables (such as tables of RIF information) so that the tables reflect the latest information available about the network. Information about the network changes as equipment fails, new equipment is brought on line, end stations are connected or disconnected, an end station with a given IP address (Layer 3 address) has its MAC address (Layer 2 address) changed, etc.

Routers use a variety of mechanisms in order to maintain their RIF table current. For example, a router may transmit a validation frame in response to expiration of a "validation time interval" in order to solicit a response from a station. The validation frame may be, for example, a directed ARP request frame. In one design, a validation frame is transmitted to only those stations that have not been heard from during the validation time interval. For example, a validation time interval of 15 seconds has been found satisfactory. In the event that a response is received, the router updates the timing interval because the route is still good. In the event that no response is received, the router transmits an ARP Explorer packet in order to re-build the route to the station. The ARP Explorer packet performs both the ARP protocol in Layer 3, and the All Routes Explorer (ARE) protocol in Layer 2, or alternatively the Single Route Explorer (SRE) protocol in Layer 2. The ARP and ARE/SRE protocols are fully described by Radia Perlman in her above mentioned book *Interconnections, Bridges and Routers*, particularly in Chapter 4, *Source Routing Bridges*, pages 99-125. Also, in another implementation a router may continually update its RIF information by examining the RIF of packets which pass through the router as the router routes them from a source SRB subnet to a destination SRB subnet. For example, in the IEEE 802.5 token ring protocol the RIF has a "type" designation, with the following three types: a specifically routed frame; an all routes explorer frame (used in ARE protocols); or a spanning tree explorer frame (used in SRE protocols). In some protocols the ARP protocol and the ARE/SRE protocol may be combined in an "ARP Explorer packet".

ARP Explorer "request" and "response" packets are distinguished. ARP Explorer request packets are transmitted by a transmitting station seeking a binding between a Layer 3 address and a Layer 2 address including RIF information of a target station. ARP Explorer response packets are transmitted by the target station in response to receiving an ARP Explorer request packet. The target station transmits a response packet for each request packet which it receives. The ARP Explorer response packet is a directed packet from the target end station to the source station that transmitted the ARP Explorer request packet.

Exemplary Embodiment

Turning now to FIG. 1, network 100 is shown. Network 100 is made up of a plurality of Source Routing Bridge subnets (SRB subnets) 102, 104, 106, 108. Each of the subnets comprises an IEEE 802.5 token ring network joined by bridges configured for source routing (SRB bridges). For example, subnet 102 is made up of IEEE 802.5 token ring 110, SRB bridge 112, IEEE token ring 114, SRB bridge 116, and IEEE 802.5 token ring 118.

SRB subnet 102 is connected through line 120 to router 130. Additional IEEE 802.5 token rings (not shown) may be connected to SRB bridge 112 at port 123, or for example, at port 124, etc. Also, SRB bridge 116 could be connected through different ports (not shown) similar to ports 123 and 124 of SRB bridge 112 to additional IEEE 802.5 token ring networks.

SRB Subnet 104 connects through line 122 to router 130. Likewise, SRB subnet 106 connects through line 124 to router 130. And further, SRB subnet 108 connects through line 126 to router 130. Each of the various subnets 102, 104, 106, 108 comprise a number of IEEE 802.5 token rings connected by a plurality of SRB bridges. And further, each SRB bridge may be connected to a plurality of other IEEE 802.5 token rings (not shown in FIG. 1). All token ring numbers must be unique, however only bridge numbers between any two token rings must be unique. The RIF has 12 bits for ring number and only 4 bits for bridge number. In order to be able to designate enough bridges, uniqueness of bridge numbers is required only for all bridges joining any two token rings. For example, if Bridge X bridges between Token Ring 1 and Token Ring 2, and Bridge Y also bridges between Token Ring 1 and Token Ring 2, then Bridge X and Bridge Y must have unique bridge numbers (that is X cannot equal Y). However, if Bridge X bridges between Token Ring 1 and Token Ring 3 (where Token Ring 3 is NOT token Ring 2), then Bridge X and Bridge Y can have the same bridge numbers (that is X can equal Y).

Additional subnets (SRB or otherwise) may be connected to router 130 at line 132, line 134, etc. Line 136 may, for example, connect router 130 to a Wide Area Network (WAN not shown).

Each of the IEEE 802.5 token rings is assigned a number. Correspondingly, each of the SRB bridges is assigned a number. For example, IEEE 802.5 token ring 110 is assigned the number "Ring 1". SRB bridge 112 is assigned a bridge number "BR 1". IEEE 802.5 token ring 114 is assigned ring number "Ring 2". SRB bridge 116 is assigned Bridge number "BR 2". IEEE 802.5 token ring 118 is assigned ring number "Ring 3", etc. as shown in FIG. 1.

Also, each ring and bridge in the other SRB subnets, subnet 104, 106, 108, etc. are assigned a ring number and a bridge number as shown in FIG. 1. Also, for example, each token ring network (not shown) which could be connected to a SRB bridge through a port (not shown) is assigned a unique ring number. Also, each SRB bridge is assigned a bridge number.

Router 130, through ports connected to lines 120, 122, 124, 126, etc. routes packets from a source SRB subnet to a destination SRB subnet. In the following example, both the end stations and the router have populated their ARP table with the necessary Layer 3 address and the Layer 2 extended address including the MAC address and the RIF information. For example, end station 132 on subnet 102 may transmit a packet (generally, a message) designated for end station 134 on subnet 108. The message is designated as a "packet" because the MAC destination address is that of router 130 and the IP destination address is for an end station on another subnet. The packet contains the IP address (Layer 3) of end station 134, and the MAC (address Layer 2) of router 130 along with a RIF giving routing information through subnet 102 from end station 132 to router 130. The packet transmitted by end station 132 is detected by SRB bridge 112, and forwarded to ring 114. SRB bridge 112 knows to forward the packet by information which it reads from the RIF of the packet, obtained by reading the Layer 2 header of the packet. The packet then travels around IEEE 802.5 token ring 114 and is detected by SRB bridge 116. Again, SRB bridge 116 reads the RIF of the packet and decides that it should forward the packet to IEEE 802.5 token ring 118. The packet then travels around IEEE 802.5 token ring 118 until it is received by router 130, since the packet contains the MAC address of router 130. Router 130 recognizes that it must route the packet to another subnet.

Accordingly, router 130 receives the packet from line 120, deletes the Layer 2 header of the packet, including the RIF, and writes a new Layer 2 header with a new RIF specifying the route to end station 134 on SRB subnet 108. Router 130 then routes the packet through its port onto line 126. The routed packet on subnet 108 has as its MAC destination address the MAC address of end station 134, as well as the IP destination address of end station 134. (Technically the "packet" just became a "frame" because it now has both the MAC and the IP addresses of the destination end station. However, we will continue referring to it as a "packet" because it is a message entity exchanged between Layer 3 of the OSI protocol in the source and the destination end stations, as described more fully with reference to FIG. 2.) The packet then travels to ring 16, is forwarded by bridge BR 12 to ring 15, is then forwarded by bridge BR 11 to ring 14, is then forwarded by bridge BR 10 to ring 13, and is finally forwarded by bridge BR 9 to ring 12. As the packet travels around IEEE 802.5 token ring 12, it is detected by end station 134. End station 134 then recognizes its MAC address and receives the packet.

Figure 2:
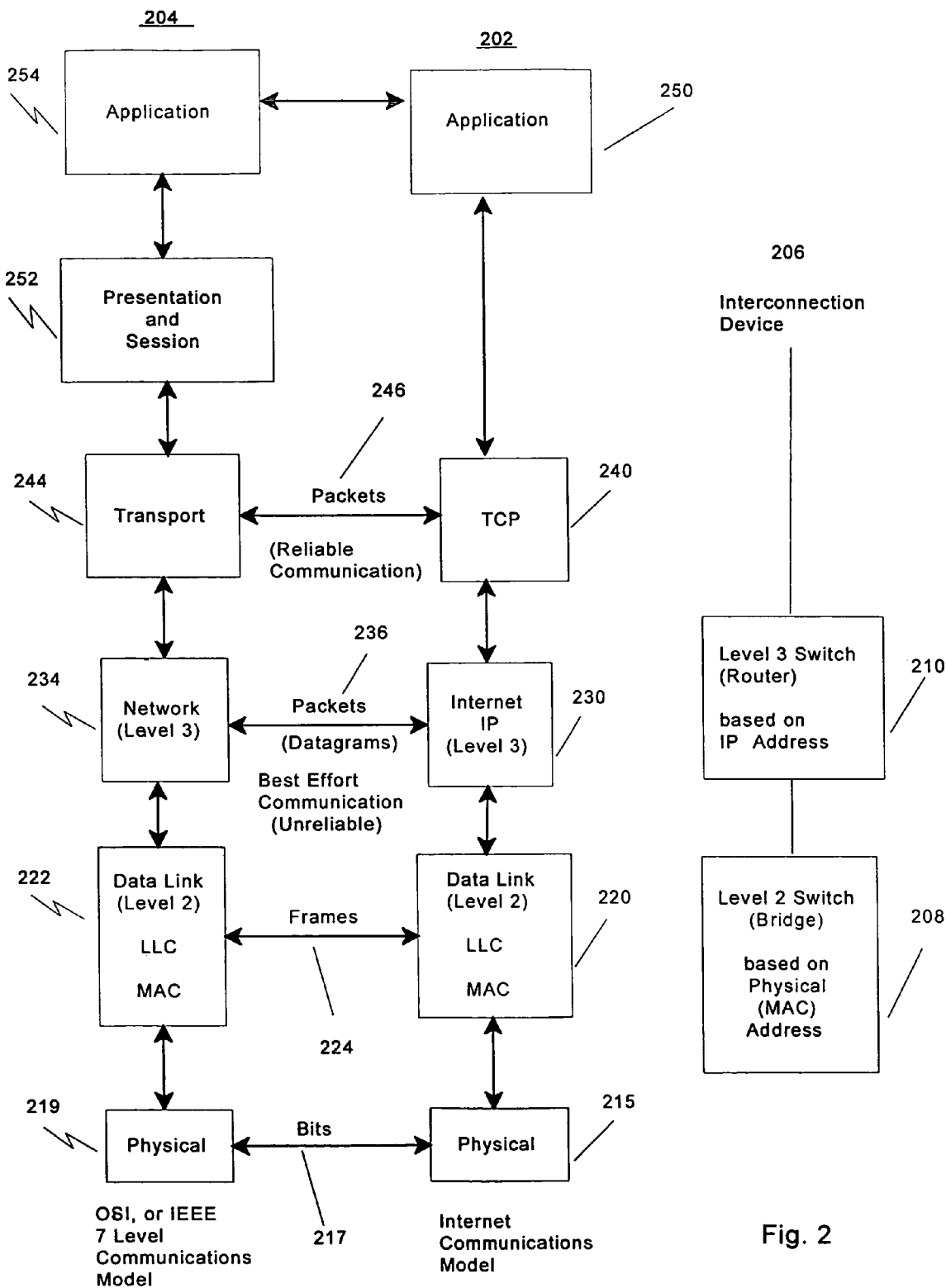
FIG. 2 is a block diagram of communications protocols and interconnecting devices.

Turning now to FIG. 2, the Internet Communications model 202 is shown, along with a comparison with the OSI model, or IEEE 802 seven (7) Layer communications model 204. Also, a representation of the interconnection devices 206 used as Layer 2 switch 208 (also known as a bridge) and as a Layer 3 switch 210 (also known as a router) are shown. Other Layer 3 protocols, for example, TCP/IP, Apollo, Appletalk, CLNS, DECnet, IPX, Vines, XNS, etc., use communications models similar to the OSI model 204, and similar to the Internet model 202. At the physical Layer, box 215 of the Internet communications model, bits are exchanged by a source station (not shown) and a destination station (not shown). Arrow 217 shows the correspondence between the physical Layers of the two models, box 215 and box 219, and also shows that the physical Layers exchange bits over the connection medium (for example, electrical, fiber optics, optical, etc.).

The data link Layer (DLL Layer) of the Internet model is represented by block 220. The corresponding DLL Layer of the OSI/IEEE model is box 222. Arrow 224 indicates that frames are exchanged by two stations at Layer 2 of both the Internet communications model and the OSI/IEEE model. The data link Layer has a lower MAC sublayer (medium access control) and an upper LLC sublayer (logical link control). The LLC Layer is more fully disclosed in IEEE standard 802.2, all disclosures of which are incorporated herein by reference. Fields which are recognized and acted upon by a receiving station, as the frame is received, are discussed hereinbelow. The Layer 2 MAC and LLC sublayers respond to corresponding fields in frames, where the fields are designated MAC and LLC fields, respectively. Three (3) types of LLC frames are defined by the IEEE 802.2 standard. Type 1 is best effort, or unreliable, operation. Type 2 is acknowledged reliable operation, where ACK messages and packet sequence numbers are used to cause re-transmission of lost frames. Type 3 is an acknowledged connectionless operation.

Layer 3 of the Internet communications model is represented by block 230, the IP Layer of the Internet protocol. The corresponding Layer of the OSI/IEEE model, the "network" Layer, is shown by block 234. Layer 3 devices respond to Layer 3 fields in a frame. In the event that the IP destination address in the frame (a Layer 3 field) is for an end station and the MAC destination address (a Layer 2 field) is for an intermediate router, the frame is referred to as a "packet". Arrow 236 indicates that packets are exchanged between Layer 3 entities of the OSI model, that is between Layer 3 in the source station and the destination station. Alternatively, the term "datagram" is used to refer to packets exchanged between Layer 3 entities in source and destination stations, as shown at arrow 236, however the term "packet" will be used herein. In communication between stations, either on a single local area network, or separated by half the circumference of the Earth with many hops between source and destination stations, packets are exchanged at Layer 3 as a best effort communication, and so provide unreliable communication.

Block 240 represents the TCP (transmission control protocol) Layer of the Internet communications model. The corresponding Layer of the OSI/IEEE model is the "transport" Layer, represented by block 244. Arrow 246 indicates that reliable packet communication is established by the TCP protocol. ACK messages are used to tell the IP Layer to re-transmit lost packets.

In the Internet communication model 202, the reliably received packets are passed up to the application Layer as represented by box 250. In the OSI/IEEE model 204, the reliably received packets from the transport Layer at block 244 are passed through two additional Layers, the session Layer and the presentation Layer, and then finally to the application Layer 254. Application Layer 254 of the OSI/IEEE model corresponds to the application Layer 250 of the Internet model. For example, the application Layer may represent an e-mail computer program, or may represent a file transfer computer program, or may represent transfer by a browser computer program of a web page from a server to a client, etc.

Figure 3:
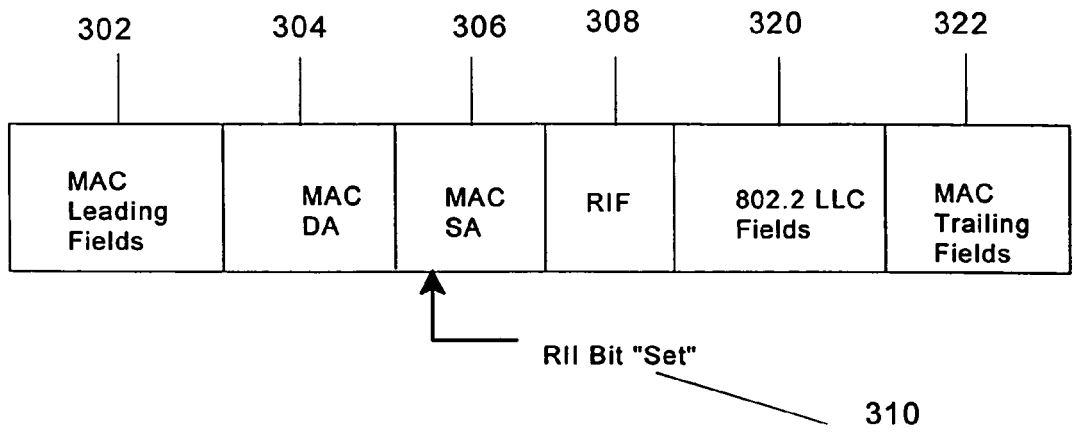
FIG. 3 is a block diagram of a MAC frame.

Turning now to FIG. 3, Layer 2 fields for a frame on a token ring local area network as defined by IEEE standard 802.5 are shown. Fields of the frame which are transmitted first and arrive first at the destination station are shown in block 302 as "MAC leading fields". The Layer 2 or MAC destination address (DA) is given in block 304. The Layer 2 or MAC source station address (SA) is given in field 306. The route information field, or RIF, is given in field 308. The receiving station knows to look for a RIF 308 after the MAC source address field 306 by reading the RII bit 310 of the MAC source address, and if the RII bit is "set" the frame is a token ring frame under IEEE 802.5 and the RIF 308 is present. Alternatively, if the RII bit 310 of the MAC source address is "clear" the frame is not source route bridged, and no RIF is present.

Fields to which the LLC sublayer of the DLL Layer 220 respond are shown in field 320. Trailing fields of the MAC frame are shown as field 322, and under some protocols comprise a frame check sequence which is used to determine the integrity of the received frame.

Figure 4:
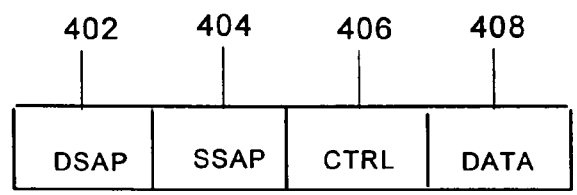
FIG. 4 is a block diagram of IEEE 802.2 LLC fields.

Turning now to FIG. 4, a first example of LLC fields 320 are shown. Field 402 is a destination service access point field (DSAP field). Field 404 is a source service access point field (SSAP field). Field 406 is a control field (CTRL field). Values in these fields control how the LLC Layer handles the frame. Field 408 is the data field, and comprises the data which it is desired to transport over the computer network, and also various header fields for the higher Layers of the protocol.

Figure 5:
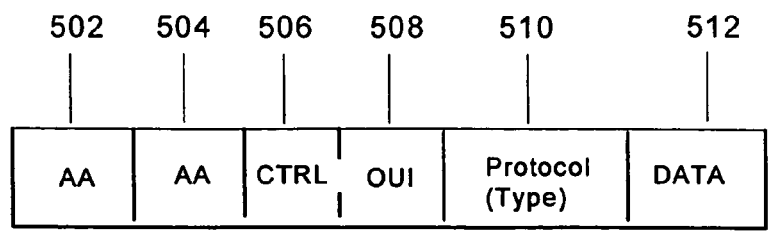
FIG. 5 is a block diagram of IEEE 802.2 LLC fields including SNAP SAP fields.

Turning now to FIG. 5, the IEEE 802.5 LLC option for the subnetwork access protocol of the service access point (SNAP SAP) fields are shown. The first two fields 502 and 504 contain the hex value of "AA". The third field 506 is the control field CTRL 406. The fourth field 508 contains an organizational unique identifier (OUI). The OUI in field 508 is usually, for example, assigned by a controlling organization such as the IEEE to a manufacturer. Field 510 contains identifiers for Layer 3 protocols such as IP, Apollo, Appletalk, CLNS, DECnet, IPX, Vines, XNS, etc. Also, an identifier for ARP packets is carried in field 510 since ARP functionality is handled by Layer 3 functions. Data fields 508, 510, and 512 correspond to data field 408, and comprises headers for higher Layer protocols and the "real" data that is being sent across the computer network.

Figure 6A:
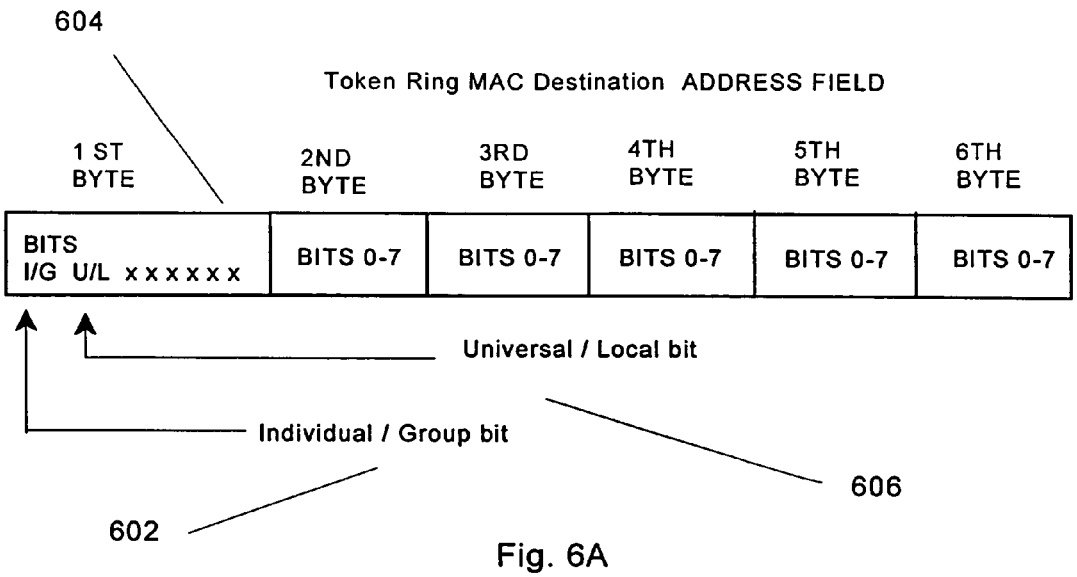
FIG. 6A-FIG. 6C are block diagrams of a MAC address field.

Turning now to FIG. 6A, there is shown a token ring frame Layer 2 destination address field 600. In each field of a token ring address field, for example destination address field 600, and in the frame as a whole, the high order byte (byte 0) is transmitted first, as is the high order bit (bit 0) within each byte (that is, left to right as in FIG. 6A). Fields of a token ring frame are disclosed in detail in the publication *Token-Ring Network Architecture Reference, Third Edition*, published by International Business Machines Corporation, 1989, all disclosures of which are incorporated herein by reference, and Layer 2 frame format is disclosed particularly at pages 2-1, 2-12.

The destination address identifies the ring stations that are to copy the frame. Destination addresses always consist of six 8-bit bytes. Bit and Byte numbers are enclosed in quote marks to distinguish them from reference numerals. Bit "0" 602 of byte "0" 604 is called the I/G bit and indicates whether the destination address is an individual address (B '0') or group address (B '1'). Bit "1" 606 of byte "0" 604 is called the U/L bit and indicates whether the address is "burned in" (that is, universally administered) (B '0'), or locally administered (B '1').

Figure 6B:
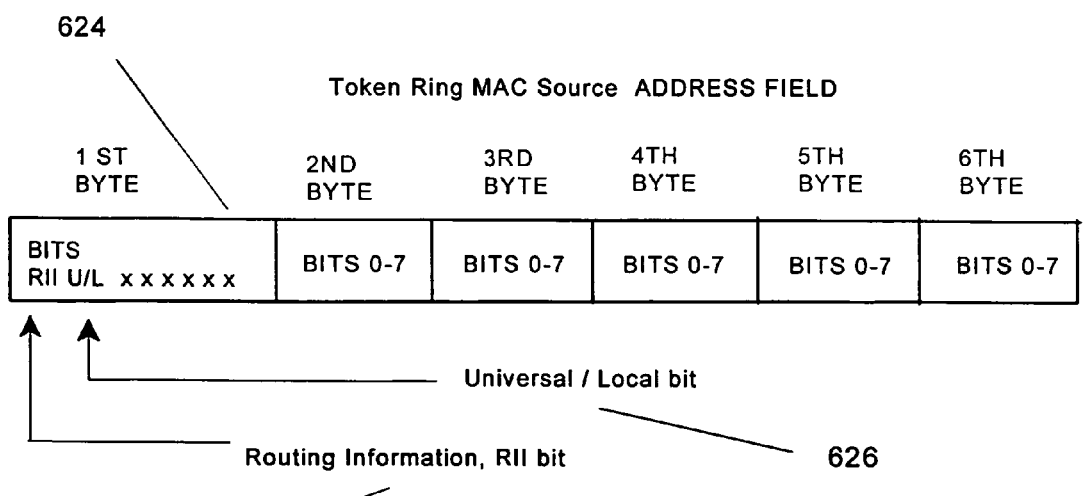

Turning now to FIG. 6B, there is shown token ring source address 620. Source addresses are always individual address, so the individual/group addresses bit distinction of destination addresses is not needed. Instead, bit "0" 622 of byte "0" 624 of the source address is called the RII bit, and is set to B'1' when there is a routing information field (RIF) present in the frame, and is set to B'0' when no RIF is present. Ring stations that do not use source routing always set the RII bit to B'0'. As in the destination addresses, bit "1" of byte "0" (called the U/L bit) indicates whether the address is universally administered (B'0') or locally administered (B'1').

Figure 6C:
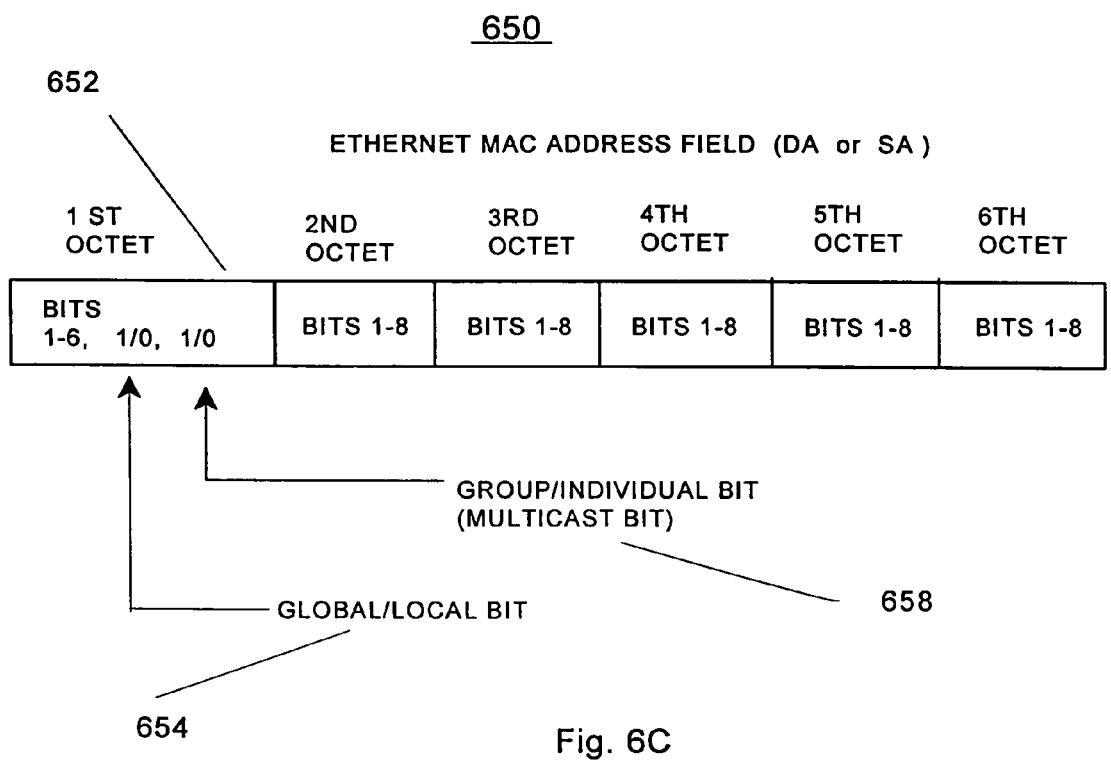

Turning now to FIG. 6C, there is shown an Ethernet MAC IEEE 802.3 Layer 2 address field 650 for an Ethernet packet. Six (6) bytes, or octets of 8 bits, comprise the address. The first byte 652, or octet, is shown as having bit 1 through bit 6 plus two specialized bits, bit 654 and bit 658. It is noted that the bit order shown in FIG. 6C is that the least significant bit is transmitted first which is referred to as "canonical format", differs from the bit order shown in FIG. 6A and FIG. 6B for a token ring frame which is most significant bit first and which is referred to as "non-canonical format". Non-canonical format is also used for bit order in FDDI token rings. Radia Perlman, in her book *Interconnections, Bridges and Routers* mentioned hereinabove, at pages 31-33 thoroughly describes the problems of bit order in different standard protocols. The problem of bit order is described herein to point out that a router, in constructing its ARP table, must be responsive to different bit order on different subnets. A global/local bit 654 indicates whether the address was set by a global organization or by a local system administrator, and a multicast bit 658 is present. When the MAC address is used as a destination address, MAC DA field 304, having the multicast bit 658 "set" indicates that the frame is a "multicast" frame.

Figure 7:
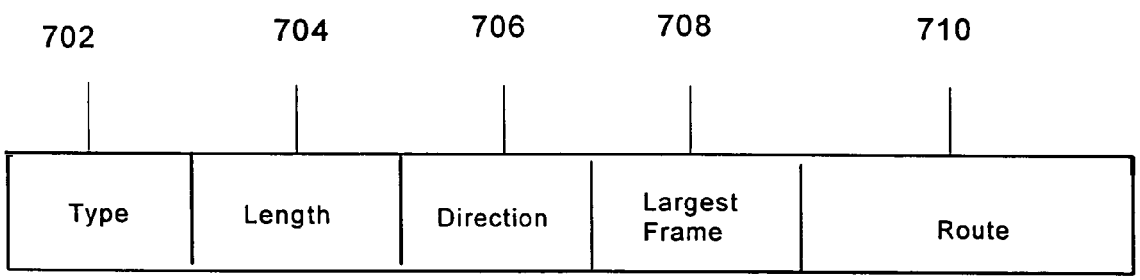
FIG. 7 is a block diagram of a RIF field.

Turning now to FIG. 7, RIF 700 is shown. RIF 700 gives a closer look at the various fields within RIF 308. Field 702 is a "type" field, and there are three (3) types of source routed frames defined by IEEE 802.5 specification: a. specifically routed frame with the route appearing in route field 710; b. an all routes explorer frame (ARE frame) as described herein; c. a spanning tree explorer frame (SRE frame) which explores routes along branches of a spanning tree.

Length field 704 gives the length of the RIF 700, that is the length of field 308. Direction field 706, is for example one (1) bit, and gives the direction of travel of a frame along the route specified in route field 710, either right to left or vice versa. The one bit in direction field 706 is referred to as the "direction bit". A destination station receiving an ARE frame flips the "direction bit" and retransmits the frame as an ARE response frame specifically routed to the source of the ARP Explorer request packet. Largest frame field 708 specifies the largest frame size which can be accommodated along the route specified in route field 710. Route field 710 gives the route specified for the frame to follow through the subnet.

Route field 710 specifies the route which the frame is to take in the SRB subnet. The route is specified by a sequence of fields each 2 bytes long, called "route designators". Each route designator comprises 12 bits for Ring number, followed by 4 bits of bridge number. For example, each route designator is of the form:

(12 bits for Ring number, 4 bits for Bridge number)

and a sequence of these number tuples designates the route through the SRB subnet which the frame will take. The route is further designated with each set of tuples separated by a period (the period is used in documents describing the RIF, not in the frame header), for example:

(R1B1.R2B2.R3B3 . . . )

where, for example, with the direction bit in field 706 set for left to right propagation, the frame is routed first to ring R1 where it is received by bridge B1 which launches it on ring R2, then from ring R2 to bridge B2 which launches it on ring R3, then to bridge B3, and etc. As mentioned above, the length field 704 gives the number of bytes in RIF 700 in order to accommodate different numbers of ring bridge tuples in the route. In order for this route designation scheme to work properly, a token ring must have a unique number in a SRB subnet, and all bridges connected between two particular token ring must have unique bridge numbers. The uniqueness of the identifying numbers results from ring numbers being designated by 12 bits, with 4095 possible ring numbers (ring 0 is reserved), and in contrast only 4 bits designating bridge numbers, leaving only 15 numbers (bridge 0 is reserved as noted below). There will be one more token ring than bridge (fence and fence post counting problem) and so the last bridge number is assigned, for example, as "0". The IEEE 802.5 standard leaves this last bridge number arbitrary, however it is convenient to assign it the number "0".

The RIF thereby establishes a route from the source end station 132 to the destination end station. There are a maximum number of bridge hops permitted in a configuration of IEEE 802.5 token ring LANs connected by SRB bridges. For example, seven (7) bridge hops, in an exemplary embodiment of token ring subnetworks, is the maximum permitted. Route designations are further disclosed hereinbelow with reference to FIG. 8.

In the next exemplary embodiment, end station 132 on subnet 102 sends a data packet to end station 134 on subnet 108. The data packet is a "packet" and not a "frame" because it contains the MAC address of router 130 and the IP address of end station 134. Also the "packet" is exchanged between Layer 3 entities in the Internet protocol in the source station and in the destination station. The data packet transmitted onto ring R1 110 by source end station 132 contains a RIF 700 (308) specifying the route from end station 132 to router 130. For example, the RIF for the message packet transmitted by source end station 132 is as follows:

R1B1.R2B2.R3B0

The route is designated as: onto ring R1 to bridge B1, then onto ring R2 to bridge B2, then onto ring R3 and finally to router 130 (designated as bridge B0, a non-existent bridge indicating that the destination station is on the last ring). Once the packet reaches router 130, router 130 recognizes its own MAC address and the IP address of destination end station 134.

Figure 8:
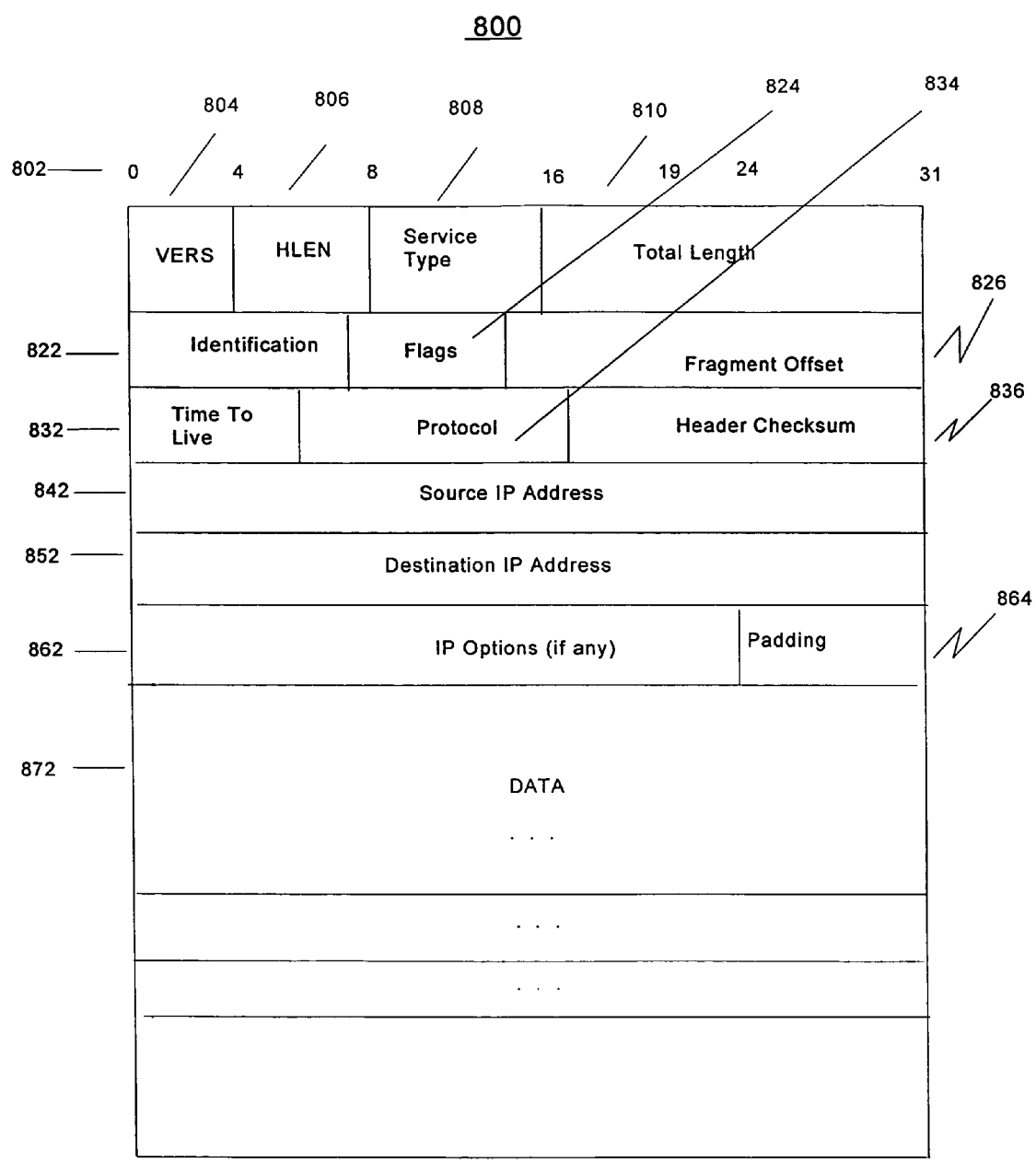
FIG. 8 is a block diagram of an IP Layer 3 header.

Turning now to FIG. 8, an exemplary Layer 3 packet format is shown under IP version 4. (An alternative exemplary IP packet is defined in IP version 6, as fully disclosed by Douglas E. Corner in his book *Computer Networks and Internets*, published by Prentice Hall, in 1997, all disclosures of which are incorporated herein by reference, especially at Chapter 18, pages 239-249.) The fields of the exemplary embodiment shown in FIG. 8 are 32 bytes across, as shown by numbers in row 802. Field VERS 804 contains the version number of the IP protocol used to create the packet. For example, detailed organization of the Layer 3 fields may depend upon the version number, however the following exemplary organization of the packet Layer 3 fields is given as an illustrative embodiment of Layer 3 design. Field 806 HELN contains the header length. Field 808 SERVICE TYPE specifies a type of IP service. Field 810 TOTAL LENGTH specifies the length of the packet. IDENTIFICATION FIELD 822, FLAGS field 824 and fragment offset field 826 aid in reassembly of fragmented packets. TIME TO LIVE field 832 gives an expiration time for the packet. PROTOCOL field 834 specifies the format of the DATA field 872. HEADER CHECKSUM field 836 ensures integrity of transmission of the header. SOURCE ADDRESS field 842 contains the IP Layer 3 address of the source station. DESTINATION ADDRESS field 852 contains the IP Layer 3 address of the destination station. IP OPTIONS Field 862 and padding field 864 contains options, if any, and padding. DATA field 872 contains the real data being transported over the computer network. IP Layer 3 headers in version 4 are more fully disclosed by Douglas E. Corner in his book *Internetworking with TCP/IP, Volume 1, third edition*, published by Prentice Hall in 1995, all disclosures of which are incorporated herein by reference, particularly at pages 89-107.

Based upon the IP destination address which router 130 reads from field 852 of the packet, router 130 then determines the Layer 2 address including the MAC address and the RIF information needed by the packet when it is launched on line 126, for the packet to reach destination end station 134 on subnet 108.

The RIF in the packet as it is launched on line 126 will have the following structure (where the structure is designated in the notation):

(R16 B12).(R15 B11).(R14 B10).(R13 B9).(R12 B0)

as the contents of the RIF. The packet will then ultimately be launched onto ring 12 of subnet 108 by bridge 9, and will be detected and received by destination end station 134.

The routing header is described in detail by Radia Perlman in the above-mentioned book "*Interconnections: Bridges and Routers*", at pages 100-101. Also routing specifications for source routing bridges are described by Chris Lewis in his book "*Cisco TCP/IP Routing Professional Reference*" published by McGraw Hill in 1998, all disclosures of which are incorporated herein by reference, particularly at pages 188-205.

Figure 9:
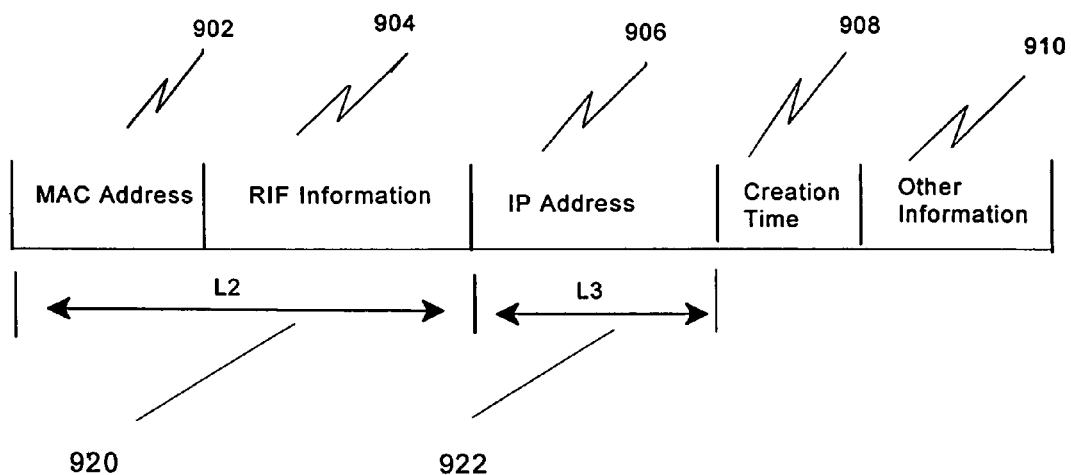
FIG. 9 is a block diagram of an ARP table in a router in accordance with the invention.

Turning now to FIG. 9, address resolution protocol table (ARP table) 900 is shown. Router 130 maintains ARP table 900. Each entry in the ARP table 900 corresponds to a single binding between a Layer 3 address, such as an IP address, and a Layer 2 address, including the Layer 2 MAC address and the RIF information needed to route a packet from the router to the end station. Each entry in ARP table 900 occupies a horizontal row (not shown in FIG. 9, shown in FIG. 10), and accordingly, each horizontal row gives a binding between a Layer 2 address (MAC address with RIF information) and a Layer 3 (IP address). ARP table 900 has fields as follows: field 902 contains the Layer 2 address (MAC address) of the end station; field 904 contains the RIF information, that is the routing information to the end station, and the RIF is a Layer 2 quantity; field 906 contains the Layer 3 or IP address of the end station; field 908 contains the creation time of the entries; and field 910 contains other information maintained in a standard ARP table.

The entry distinguishing ARP table 900 from ARP tables of the prior art is the RIF information field. In ARP table 900 the Layer 2 address has been extended to include both the MAC address and the RIF information required to route a frame or packet to the destination station.

The Layer 2 information is shown by arrow 920 as RIF information field 904 and MAC address field 902. The Layer 3 information is shown by arrow 922 as IP address 906. ARP table 900 provides a binding between: the Layer 2 data, RIF 904 and MAC address field 902; with the Layer 3 or IP address 906.

ARP table 900 provides a mechanism whereby router 130 may find information which it needs in order to complete a header in a packet being routed by router 130 onto a SRB subnetwork. For example, in the event that an incoming packet to router 130 has an IP address of a station on an SRB subnet, and has in its MAC destination address field 304 the MAC address of router 130, then router 130 looks up the IP address found in IP header field 852, and writes in the MAC destination address field 304 of the packet the MAC address found in ARP table 900 at field 902, and further writes the RIF information found in ARP table 900 at field 904 into RIF field 308 of the packet. Router 130 then routes the packet onto the appropriate SRB subnet.

The ARP table is normally maintained in the router in an architecture which permits rapid access for fast switching such as cut through routing. The function of the ARP table is to provide a binding between the Layer 2 extended MAC address including the RIF information with the Layer 3 IP address. A separate RIF cache table, requiring a separate time consuming table look-up, is thereby avoided each time that a packet is routed by the router.

Multiple Protocol Stacks

Although the focus of this discussion is on IP protocol operation in Layer 3 in the router, it is important to remember that the router "simultaneously" handles many different Layer 3 protocols. By "simultaneously" is meant that the router is receptive to packets of different protocols, and can handle packets of different protocols serially as the packets arrive at the router. Exemplary Layer 3 protocols which the router is prepared to handle include, but are not limited to: IP, the Internet protocol; Apollo; Appletalk which is proprietary to Apple Computer Corp.; CLNS, an abbreviation for connectionless-mode network service; DECnet, which is proprietary to Digital Computer Corporation; IPX and XNS which are proprietary to Novell, Inc.; Vines, which is proprietary to Banyan, Inc.; SNA, which is proprietary to IBM, but may be considered more a Layer 2 protocol; etc. The architecture of the OSI model where interfaces are established between distinct layers of the communications model creates a "protocol stack" for each Layer 3 protocol. A protocol stack is established for each Layer 3 protocol. Each protocol stack uses common Layer 1 and Layer 2 functionality, however each has different functions in Layer 3. However, Layer 2 is unaware of the differences in Layer 3 protocols and simply communicates with Layer 3 using interface primitives. And the interface primitives are the same to Layer 2 functions for all Layer 3 protocols.

The IP Layer 3 protocol uses ARP messages, and when used over IBM 802.5 token rings uses ARP Explorer packets in order to establish a binding between a station's Layer 3 address and its Layer 2 address. The binding information is than maintained in an ARP table.

Each of the other Layer 3 protocols has a mechanism similar to ARP messages for establishing a binding between Layer 3 addresses and Layer 2 addresses, and also has a table similar to the ARP table for maintaining the bindings in a router. An end station which is capable of receiving messages over several different Layer 3 protocols, for example IP, Appletalk, DECnet, XNS, etc. will have its binding between Layer 3 addresses and Layer 2 address maintained in a table for each Layer 3 protocol. These various binding tables are referred to as "ARP like" tables. Also, copies of the binding are maintained by the cut-through routing elements in the router. In the past it has been a major problem to maintain coherency with all of the copies of the bindings for the various Layer 3 protocols and the copies maintained for cut-through routing.

The invention, that is extending the MAC address to include RIF information in any "ARP like" table, greatly simplifies maintaining coherency in the various copies of address binding between Layer 3 addresses and Layer 2 addresses. The tables are implemented by computer code operating in Layer 3 of the protocol stacks. No longer is a separate reference for each Layer 3 protocol function to a central RIF cache necessary for each different protocol. Each ARP like table is simply created by Layer 3 software functions, and is read by Layer 3 functions. Each of the Layer protocols requires its own Layer 3 functions. However, the contents of the ARP like tables are passed by primitives of the interface between Layer 3 and Layer 2 for use by Layer 2 functions. The invention permits one set of Layer 2 functions to handle all of the necessary information for Layer 2 addressing including writing Layer 2 headers comprising MAC addresses and RIF information for any Layer 3 protocol. This simplicity is in contrast to the situation where each Layer 3 protocol required separate treatment, depending upon details of the Layer 3 protocol, for transferring MAC information from one source and transferring RIF information from another source.

Maintaining the ARP Table Up-to-Date

The entries in the ARP table need to be maintained up-to-date as changes in the network occur. The entries are maintained up-to-date by a validation protocol. The validation protocol uses a validation timer. In an exemplary embodiment of the invention, after expiration of the validation timer, validation is accomplished by the router first transmitting an "inquiry" message (directed ARP) to the end station using the ARP table entry. The time interval for expiration of the validation timer, in an exemplary embodiment of the invention, has been satisfactorily set at 15 seconds. In the event that the end station responds to the inquiry message, the time for expiration is incremented by another "expiration time interval". In the alternative situation, where the end station does not respond to the "inquiry" message, the router transmits an ARP Explorer request message, and thereby builds a new ARP table entry for the end station. A new ARP table entry, field 902 MAC address and field 904 RIF information and an update to the creation time field 908, are built in response to the ARP Explorer response message received from the end station.

An advantage of ARP table 900 is that it maintains a field for RIF information, field 904, along with the other Layer 2 information such as MAC address 902. It is a simple matter for common Layer 2 software functions (common for all Layer 3 protocols) of the router to use ARP table 900 to write both the RIF information from field 904 and the MAC address information from field 902 into the header of a packet 300 being routed onto a destination SRB subnet.

A standard ARP table well known in the prior art is given by the authors Douglas E. Comer and David L. Stevens in their book "*Internetworking with TCP/IP, Vol. 2, Design, Implementation, and Internals*", Published by Prentice Hall Publishing Company in 1991, all disclosures of which are incorporated herein by reference, particularly at pages 37-58. Typical fields for a standard ARP table are given by Comer and Stevens as follows:

State of this entry;
where the state may have the values representing unused, meaning that it is not resolved, pending, meaning that an entry has been placed in the table but that a binding has not been completed, or resolved, meaning that the entry and the binding are correct;
Hardware type;
Protocol type;
Length of the hardware address, that is the Layer 2 address;
Length of the protocol address, that is the Layer 3 address;
Pointer to other necessary data structures;
Pointer to a queue of packets for this hardware address;
Number of retries, to send a frame to this address;
Time to live for this entry.

"Time to live" is normally expressed as a router hop count. The "time to live" is written into a field of the Layer 3 header of a packet. The time to live is usually an integer indicating the number of Layer 3 hops between routers which the packet is permitted to have. The time to live number is decremented by each router which routes the packet. In the event that time to live is "0" when the packet is received by a router, the router does not forward the packet.

The Time to Live (TTL) field of Layer 3 is further described by RFC 791 at Section 3.2 as follows.

"The TTL field has two functions: limit the lifetime of TCP segments (see RFC-793, p. 28), and terminate Internet routing loops. Although TTL is a time in seconds, it also has some attributes of a hop-count, since each gateway is required to reduce the TTL field by at least one.

The intent is that TTL expiration will cause a datagram to be discarded by a gateway but not by the destination host; however, hosts that act as gateways by forwarding datagrams must follow the gateway rules for TTL.

A higher-layer protocol may want to set the TTL in order to implement an "expanding scope" search for some Internet resource. This is used by some diagnostic tools, and is expected to be useful for locating the 'nearest' server of a given class using IP multicasting, for example. A particular transport protocol may also want to specify its own TTL bound on maximum datagram lifetime.

A fixed value must be at least big enough for the Internet 'diameter,' i.e., the longest possible path. A reasonable value is about twice the diameter, to allow for continued Internet growth."

Additional discussions concerning commonly used address resolution protocols, ARP protocols, along with methods by which a router maintains an ARP table are given by Andrew Tanenbaum in his book *Computer Networks, 3rd edition*, mentioned hereinabove, at pages 420-424.

Routing Between Subnets

Turning now to FIG. 10, a more detailed view of an ARP table 10,000 maintained in router 130 is shown. ARP table 10,000 serves two functions, first it gives the route information in RIF column 904 as part of the Layer 2 (MAC) address which is given in column 902, and secondly it gives a binding between the Layer 2 address and the Layer 3 (IP) address given in column 906. The columns correspond to the layout shown in FIG. 9, and are assigned reference numerals accordingly. Row entries are shown, where each row entry corresponds to a path from the router to an end station port (end station ports are abbreviated ESPn, where "n" is an identifying number assigned to an end station port). Each end station may have separately addressable ports, and this notation provides for a route to each port, as different ports may be assigned for different types, protocols, etc. of frames, of packets, etc., and may have different MAC addresses, etc. Row 10,002 gives the binding for end station port 1 (ESP1), row 10,004 gives the binding for end station port 2 (ESP2), etc., etc. at row 10,008, and finally row 10,010 gives the binding for end station port "n" (ESPn).

Figure 11:
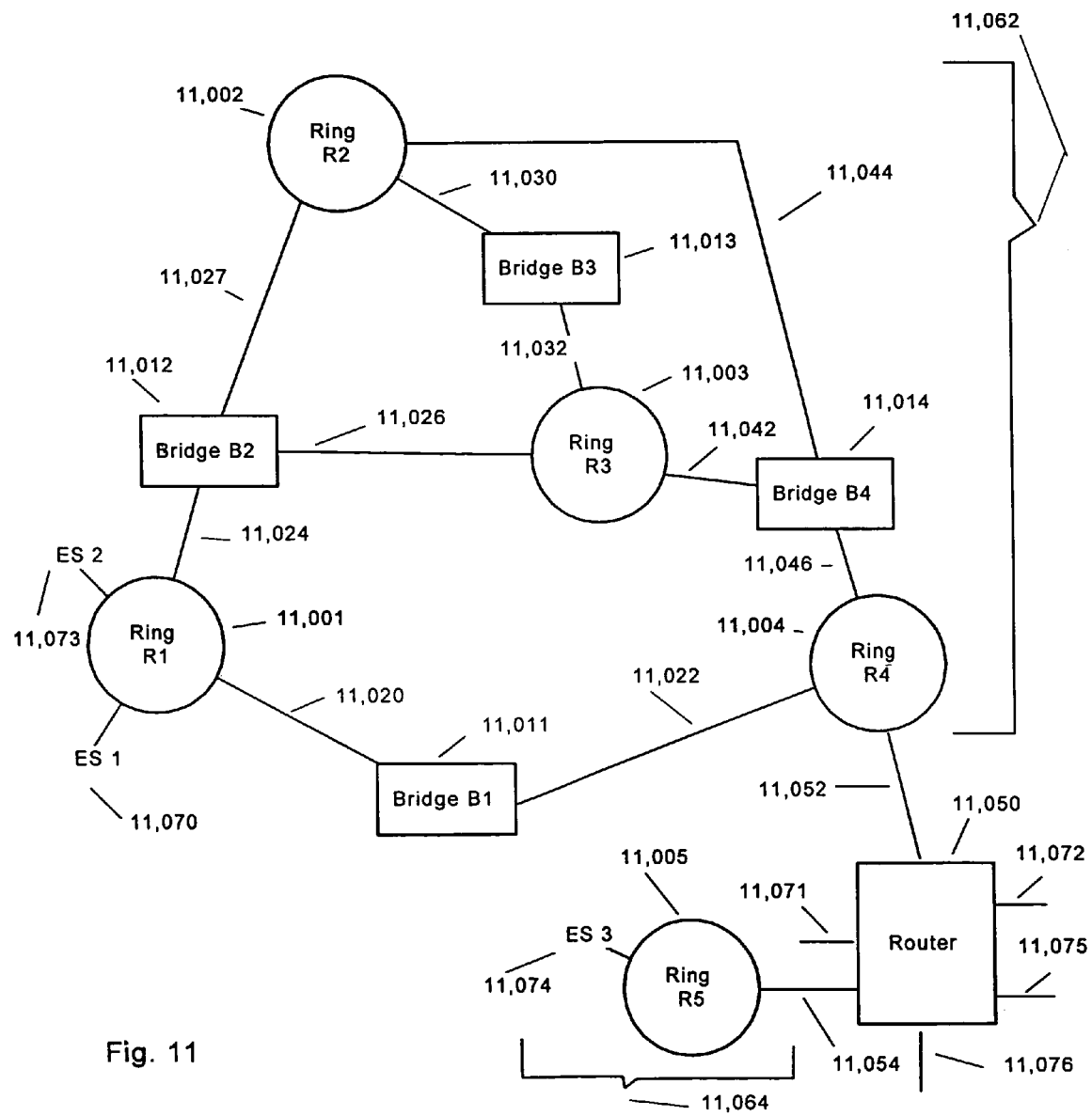
FIG. 11 is a block diagram of a SRB subnet.

Turning now to FIG. 11, an exemplary source routing bridge network (SRB network) 11,000 is shown. SRB network 11,000 has, for example, two SRB subnets shown explicitly, SRB subnet 11,062 and subnet 11,064. The first subnet, SRB subnet 11,062, has four (4) IEEE 802.5 token ring networks, Ring R1 11,001, Ring R2 11,002, Ring R3 11,003, Ring R4 11,004. The second subnet, SRB subnet 11,064, has Ring R5 11,005. Router 11,050 provides a path between the two subnets.

Source routing bridges (SRB bridges) provide communication paths between token ring networks as follows. SRB bridge B1 11,011 connects by path 11,020 to Ring R1 11,001 and by path 11,022 to Ring R4 11,004. SRB bridge B2 connects by path 11,024 to Ring R1 11,001, by path 11,026 to Ring R3 11,003, and by path 11,027 to Ring R2 11,002. SRB bridge B3 11,013 connects by path 11,030 to Ring R2 11,002, and by path 11,032 to Ring R3 11,003. Bridge B4 11,014 connects by path 11,042 to Ring R3 11,003, by path 11,044 to Ring R2 11,002, and by path 11,046 to Ring R4 11,004.

Router 11,050 connects by path 11,052 to Ring R4 11,004, and connects by path 11,054 to Ring R5 11,005. Router 11,050 has additional ports connecting to various paths, for example, path 11,071, path 11,072, path 11,075, path 11,076, etc., which may connect to other SRB subnets, or may connect to wide area networks, or may connect to an Internet network cloud, etc.

Router Table Providing RIF Information

A path from router 11,050 to end station ES1 11,070 which designates the packet to pass from ring 4, bridge 1, ring 1, and finally to ES1 11,070 is as follows: first, the router port for the route is read from field 910 (other information) of ARP table 10,000 as shown in FIG. 10, and the packet is launched onto ring R4 11,004 through path 11,052 by router 11,050. The path designated in the RIF of the packet is:

R4_B1.R1_B0.

The last bridge numbered is, by convention, set equal to "0". In response to this content in field 710 of the RIF 308 of the packet, bridge B1 11,011 forwards the packet onto ring R1 11,001. The packet travels around ring R1 11,001 where it is detected by all end stations connected to ring R1, and in particular it is received by end station ES1 11,070, by that end station recognizing its Layer 2 MAC address in field 304 of the packet. The packet has therefore reached its intended destination end station through its designated path.

Alternatively, ARP table 10,000 or (900) could specify a path sending the packet addressed to end station ES1 11,070 through ring R4 11,004, Bridge B4 11,014, Ring R2 11,002, Bridge B2 11,012, and finally to ring R1 11,001 where the packet is received by ES1 11,070. This path is specified in Route field 904 as follows:

R4_B4.R2_B2.R1_B0 along, again, with field 910 (other information) telling the router to launch the packet through path 11,052 to ring R4 11,004. Again, the last bridge number is set to "0".

As a further alternative, the packet may be designated to pass along a path through Ring R4 11,004, bridge B4 11,014 to ring R3 11,003, through bridge B3 11,013, and then to ring R2 11,002, then through bridge B2 11,012 to ring R1 11,001 where it is received by end station ES1 11,070. The path designation for this route is:

R4_B4.R3_B3.R2_B2.R1_B0 along with field 910 (other information) telling the router to launch the packet through path 11,052 to ring R4 11,004. Again, the last bridge number is set equal to "0".

One of these paths, or an alternative etc., is stored in ARP table 10,000 at row 10,002 and column 904, because row 10,002 stores the path to end station ES1 11,070 from router 11,050. The path which is stored in row 10,002 is determined by an ARE process discussed hereinbelow.

The packet as received by router 11,050 may have been sourced from another SRB subnet, or may have arrived from a network which does not employ source route bridging, etc. In any event, router 11,050 reads RIF information for the destination end station, for example ES1 11,070 from row 10,002 of ARP table 10,000. Router 11,050 then writes the content of the field at row 10,002, column 904 into the RIF 308 of the MAC header 300 of the packet, in addition to writing the MAC address into the packet. The router then, in response to its port number found in the other information field 910, launches the packet onto the first ring of the destination SRB subnet. The contents of the RIF, read from column 904 of ARP table 10,000 and written to the RIF 308 of the outgoing packet, then direct the path of the packet to the destination end station.

Populating the Router ARP Table, Including RIF Information

ARP table 10,000 (also 900) is maintained by Router 11,050. ARP table 10,000 serves a number of functions, particularly it provides a binding between the Layer 2 designation of an end station including the MAC address and the RIF information with the Layer 3 designation (IP address) of the end station. The binding is established by the execution of an Address Resolution Protocol sequence by the router 11,050.

When a computer (end station, router, etc.) executes an Address Resolution Protocol sequence we say that the machine ARPs. In the event that an end station (source end station) decides to send a packet to a destination end station, and the source end station knows only the Layer 3 or IP address of the destination end station, then the source end station ARPs by transmitting an ARP Explorer packet. The ARP Explorer protocol then gives to the computer the MAC address and RIF information to the destination station, which the computer then writes into its ARP table.

Use of ARP messages, and separately ARE messages, are disclosed in the above mentioned book by Radia Perlman, *Interconnections, Bridges and Routers*, particularly Chap. 4 pages 99-125 for ARE messages in a SRB network, and Chap. 8 pages 203 for ARP messages both as set out in the OSI protocol and the IP protocol. The ARP table is then populated by the MAC address in field 902 and RIF information in field 904.

In some exemplary embodiments, an ARP Explorer (SRE) request packet is routed along a spanning tree so that only one copy reaches the destination end station. In contrast, an ARP Explorer (ARE) request packet has the property that it divides at every point in the subnet where it reaches a choice between paths, so that copies of the ARP Explorer (ARE) packet proceed along all possible paths of the SRB subnet. For example, in the event that router 11,050 launches an ARP Explorer (ARE) request packet onto path 11,052, then at bridge B4 11,014 the ARP Explorer (ARE) request packet will be copied onto both path 11,042 and path 11,044. Also, the route taken by the ARP Explorer (ARE) request packet is written into the RIF field of the packet. When the copy traveling on path 11,042 reaches ring R3, both bridge B3 11,013 and bridge B2 11,012 receive the packet, copy it, and launch a copy on each path connected to a port of the bridge. Likewise, when the copy of the ARP Explorer (ARE) request packet traveling on path 11,044 reaches ring R2 11,002 then it is received by both bridge B3 11,013 and bridge B2 11,012, both of which write the route into the RIF field of the ARP Explorer (ARE) request packet and launch it onto every path connected to these bridges. Without action being taken by bridges, multiple copies of the ARP Explorer (ARE) request packet could begin circulating around loops in subnet 11,062. However a bridge checks the RIF information, and if the ARP Explorer (ARE) request packet has already been on the destination ring the bridge does not forward it. In any event, end station ES1 11,070 on ring R1 11,001 will receive multiple copies of the ARP Explorer request packet, each with a different route written into Route field 10,010 of the RIF 308.

Protocol standards, for example IEEE 802.5, require that any destination station receiving an ARP Explorer request packet respond by resetting the direction bit and retransmitting the packet as an ARP Explorer response packet. The RIF information built up in the ARP Explorer request packet then routes the ARP Explorer response packet back through the rings and bridges specified by the RIF information, in reverse order. The ARP Explorer response packet is then a specifically routed packet, being routed in reverse along the path which the ARP Explorer (ARE) request packet traveled. The station transmitting the ARP Explorer (ARE) request packet then receives multiple copies of the ARP Explorer response packets, each copy containing a different RIF information, depending upon the route taken by the ARP Explorer (ARE) request packet. The station transmitting the ARP Explorer request packet must then decide which RIF information to use in populating its ARP table.

In an alternative embodiment mentioned hereinabove, the ARP protocol and the ARE or the SRE protocol are combined into a packet referred to as an ARP Explorer packet (either ARE or SRE). Use of an ARP Explorer packet is the normal case for SRB networks. So, the station transmitting the ARP Explorer (ARE) packet receives multiple copies of the ARP Explorer response packet, each with RIF information built up in the RIF field of the request packet. In contrast, the station transmitting an ARP Explorer (SRE) request packet receives only one response, as the destination station receives only one copy of the request packet, and that request packet traveled along the spanning tree.

Router 11,050 acquires the needed RIF information for a route to end station ES1 11,070 by receiving the returned ARP Explorer response packets As mentioned above, the router must choose which RIF information to cache in its ARP table.

The router (or any end station) may choose the route by any one of several methods, for example, using the first received ARP Explorer response packet, as it probably came by the shortest and therefore most desirable route. Alternatively the router may use any of the various methods mentioned by Radia Perlman in her book *Interconnections*, incorporated hereinabove by reference, at pages 112-120, including: select the first ARE response packet received; select a route whose packet size field indicates transmission of the largest packet (where the ARP Explorer request packet records, in field 708, the largest packet size which can be transmitted over a link); select the route with the fewest hops; use some combination of the above selection criteria, etc.

In a preferred embodiment of the invention, the router chooses the RIF information in the first ARP Explorer packet (either request or response) received by the router. Details of how this choice is made are discussed hereinbelow with reference to the duplicate ignore timer.

Duplicate Ignore Timer

The duplicate ignore timer will be described herein using the terminology of TCP/IP protocol running over an SRB network of IEEE 802.5 token rings, and using ARP Explorer packets. ARP Explorer request packets are transmitted by a transmitting station seeking a binding between a Layer 3 address and a Layer 2 address including RIF information of a target station, and are distinguished from ARP Explorer response packets which are transmitted by the target station in response to receiving an ARP Explorer request packet. The target station transmits a response packet for each request packet which it receives. The ARP Explorer response packet is a directed packet from the target end station to the source station that transmitted the ARP Explorer request packet using the RIF built up in the "request" packet, but with the direction bit flipped.

Which route, as discovered by the ARP Explorer request packet launched by router 11,050, and returned to the router as an ARP Explorer response packet, will be used by router 11,050 to populate the end station ARP table entry in the row corresponding to the end station, is a question of policy. It is to be understood that the "duplicate ARP Explorer response packets" received by the router are not identical, but have different routes built up in their RIF fields. Each ARP Explorer packet arriving at the destination station took a different route through the SRB subnet, and that route is used by the destination station to return the response to the router by the destination station "flipping" the direction bit, building the response packet, and then transmitting the response packet.

In a preferred embodiment of the invention, a timer (the duplicate ignore timer) is used to help select the first response packet to reach the router from an end station, the end station transmitting the response packet in response to the end station receiving an ARP Explorer request packet. The first received ARP Explorer request packet probably generates the first ARP Explorer response packet received by router 11,050, as the packets probably traveled along the fastest route between the router and the end station. Accordingly, the duplicate ignore timer method selects the fastest route between the router and the destination station. The duplicate ignore timer is implemented in the router 11,050.

In operation, the time interval of the duplicate ignore timer starts after the router receives the first ARP Explorer response packet. And the router then ignores another ARP Explorer response packet until expiration of the time interval.

An additional benefit of the duplicate ignore timer is that in the event that an end station transmits an ARP Explorer (ARE) request packet, the duplicate ignore timer selects the first copy of the request packet to reach the router. In an exemplary embodiment of the invention, it is desirable to update the ARP table 900, 10,000 entry when an ARP Explorer (ARE) request packet is received from an end station. The end station may have ARPed because the old route went "down", and so a new ARP Explorer (ARE) packet will contain a new route to the end station which is operational. It is therefore desirable to update the ARP table entry in the router for that end station with the new operational route to that end station. However, the router will receive duplicate copies of the ARP Explorer (ARE) request packet transmitted by the end station. The RIF field of the ARP Explorer (ARE) request packets received by the router contain valid routes to the end station. Again, the router must choose which copy of the ARP Explorer (ARE) request packet to use in updating the router's ARP table entry. In a preferred embodiment of the invention, the router chooses the first ARP Explorer (ARE) request packet received from the end station, because the first copy most probably has the fastest route between the router and the end station and so is the most desirable route. The duplicate ignore timer implements the router receiving the first ARP Explorer (ARE) request packet for updating the router's ARP table and ignoring later received copies of the request packet.

A timer such as the duplicate ignore timer may be implemented in a computer in a number of ways known to those skilled in the art of computer technology. In a preferred embodiment of the invention, the timer is implemented by saving the "time of receipt" of the first received ARP Explorer packet (request or response) and storing it in Creation Time field 908. As duplicate ARP Explorer (request response) packets are received a "timing function" reads current time maintained by the computer, computes elapsed time by subtracting the "Creation Time" found in field 908 for that end station from current time, and then does a compare between the elapsed time and a "timeout interval". The timeout interval is a number in memory that is accessible to the timeout function. In the event that the elapsed time is smaller than (or equal to) the timeout interval, the ARP Explorer packet (request or response) is ignored. In the event that the elapsed time is greater than the timeout interval, the ARP Explorer packet (request or response) is used to overwrite the ARP table entry.

Pseudo Code for Duplicate Ignore Timer

In an exemplary embodiment of the invention, pseudo code for implementing the duplicate ignore timer is set out below. The pseudo code updates the RIF of the ARP like table of FIG. 9 or FIG. 10 in a router by the first detected ARP request received from an end station, or from the first returning response to an ARP Explorer request packet launched by the router. Duplicates are ignored for a time interval established by a time parameter referred to as the DUPLICATE_IGNORE_TIME_INTERVAL. It has been found satisfactory to set the DUPLICATE_IGNORE_TIME_INTERVAL to 2 minutes in an exemplary embodiment of the invention, in order to ignore duplicate ARP packets.

Exemplary pseudo code follows.

```
1 compare_result = compare_rif(arp_entry -> rif, arp_packet->rif);
2 if(compare_result == RIF_DIFFERENT){
3 current_time = get_current_time( );
4 time_elapsed = current_time - arp_entry-> create_time;
5    if(time_elapsed  >  DUPLICATE_IGNORE_TIME_INTERVAL) {
6    update_arp_entry_with_new_rif(arp_entry,  arp_packet->rif);
7 update_arp_entry_with_new_create_time(arp_entry, current_time);
8 }
9 }
```

Operation of the pseudo code is as follows. Line 1 calculates a Boolean variable "compare_result", which is true if the RIF entry of an ARP Explorer packet (arp_packet->rif) is equal to the RIF of the ARP like table (arp_entry->rif). The ARP Explorer packet may be either a request packet launched by an end station, or a response packet from an end station in response to a request launched by the router.

Line 2 is an IF statement which executes the statements following the open bracket in the event that "compare_result" indicates that the two values of RIF are different, from Line 1. Line 3 sets a variable "current time" equal to the current system time by executing a function "get_current_time( )". Line 4 then calculates a variable "time_elapsed" by subtracting the creation time of the ARP entry (arp_entry->create_time) from the current system time.

Line 5 is another IF statement, and executes the statement following the open bracket in the event that the elapsed time is greater than a stored time parameter "DUPLICATE_IGNORE_TIME_INTERVAL". The stored parameter DUPLICATE_IGNORE_TIME_INTERVAL is the duplicate ignore timer timeout interval. In the event that the elapsed time is greater than the parameter DUPLICATE_IGNORE_

TIME_INTERVAL, then Line 6 and Line 7 are executed, with Line 6 updating the RIF entry field 904 of FIG. 9 or FIG. 10 from the RIF in the ARP packet, and Line 7 updating the creation time of the RIF entry, field 908 of FIG. 9 or FIG. 10.

Alternatively, in the event that the elapsed time is not greater than (i.e., less than or equal) the parameter DUPLICATE_IGNORE_TIME_INTERVAL, then the pseudo code goes to Line 8, and then to Line 9, and does not update the RIF entry. Duplicate copies of an ARP packet, either request or response, are expected to be detected within the time interval DUPLICATE_IGNORE_TIME_INTERVAL. That is, duplicate copies of the ARP packet, either requests launched by an end station or responses to an ARP Explorer request packet launched by the router, are ignored by the router as the pseudo code does not execute Line 6 or Line 7.

The IF statement of Line 2 skips to Line 9 when the two RIF values are equal in Line 2, and no updates occur. Accordingly, when the ARP packet RIF and the ARP entry RIF are the same, no updates occur.

Advantages of the Duplicate Ignore Timer

The duplicate ignore timer serves two functions. First, it causes the router to ignore duplicate ARP Explorer packets (either response or request packets) during the timeout interval. Second, it makes the router sensitive to receiving a new ARP Explorer packet (either response or request packets) after expiration of the timeout interval.

The timeout interval of the duplicate ignore timer is set sufficiently long so that all duplicate ARP Explorer packets (either response or request packets) received by the router, as a result of transmission of one ARP Explorer request packet by either the router or the end station, are expected to reach the router before expiration of the duplicate ignore timer.

Further, the duplicate ignore timer is set to a sufficiently short time interval so that should router 11,050 launch a new ARP Explorer request packet seeking a route to end station ES1 11,070, then the router will most probably be receptive to a new route carried by the first new ARP Explorer response packet generated by duplicates of the new ARP Explorer request packet. The receptiveness results from expiration of the duplicate ignore timer. The timeout interval of the duplicate ignore timer is long enough so that the router ignores all of the duplicates arising from one ARP Explorer request packet, and short enough so that the router is most probably responsive to the next ARP Explorer request packet, and its corresponding ARP Explorer response packets. Also, the time interval of the duplicate ignore timer is set sufficiently short so that the timer will, most probably, be expired before the end station transmits another ARP Explorer (ARE) request packet.

A new route may be needed because a bridge on the old route went "down", congestion at a bridge or on an intermediate token ring caused loss of message packets, or some other network condition changed.

All ARP Explorer response packets coming from a particular end station are substantially identical except for the RIF value. Without the duplicate ignore timer, the ARP Explorer response packets would have to carry an indicia of the ARP Explorer request packet such as a sequence number, etc. in order for the router to be both responsive to the first ARP Explorer response packet, and also to be responsive at a later time to the next "first" ARP Explorer response packet. Such a change in the protocol would require changes in all end stations, which is not practical. Furthermore, sequence numbers do not solve the duplicate problem when the end station ARPs. In contrast, the duplicate ignore timer, implemented in the router, permits rejection of quickly received duplicate ARP Explorer packets, either request or response packets, while permitting reception of a "first" ARP Explorer packet, either request or response packet, after expiration of the duplicate ignore timer.

Another method which could be used to solve the problem of receiving duplicate response packets in response to transmission of an ARP Explorer packet would be to use a spanning tree directed explorer packet. The spanning tree explorer packet is forwarded by bridges only onto one outgoing port, the port selected by the spanning tree algorithm. Accordingly, only one copy of the spanning tree explorer is received by the destination station, and so only one response packet is returned to the router. However, this solution is not practical for implementation in a commercial router because not all networks have spanning trees. It is a desirable goal to have a commercial router operational on all commonly employed networks, and this goal cannot be met by using a spanning tree explorer packet.

In a preferred embodiment of the invention, the timeout interval of the duplicate ignore timer is chosen as two (2) minutes. A two minute timeout interval has been found long enough so that all duplicate copies of ARP Explorer response packets arising from a single ARP Explorer request packet launched by a router on a SRB subnet will reach the router within the 2 minute interval, and to be short enough so that the router can change its stored route in response to dynamic changes within the subnet. In a preferred embodiment of a commercial router design, a two minute timeout interval is set as a default value. However, provision is made for an owner of the router to override the default value in the event that another value is more suitable for a particular network.

The router also updates the entry in its ARP table upon receipt of an ARP Explorer request packet received from an end station. In addition to responding to the request by transmitting a response packet, the router updates its entry in its ARP table and starts the duplicate ignore timer. The duplicate ignore timer prevents duplicates of the ARP Explorer request packet from overwriting the first received request packet, and so selects the fastest route from the end station for its entry in its ARP table. It is desirable to update the entry in the ARP table of the router upon receipt of an ARP Explorer packet because the end station may have tried unsuccessfully to contact the router, because possibly an old route had gone down, etc., and the end station ARPed.

After expiration of the duplicate ignore timer the router is once again receptive to receiving the next ARP Explorer response packet, or the next ARP Explorer request packet transmitted by an end station.

There are a plurality of reasons why it is convenient for the router to be responsive to reception of the next ARP Explorer packet, either request or response packet, as is provided by the duplicate ignore timer. The following list comprises a partial list of such reasons.

A first reason is that updates of the ARP table with the extended MAC address are controlled by the ARP process. The ARP process has a timeout interval, the "ARP timeout interval". The ARP timeout interval is set by a number of considerations in addition to updating the RIF field in the ARP entry, for example the router may be handling Ethernet packets (which do not have a RIF) as well as packets requiring a RIF, and the time out period must accommodate all packets forwarded by the router. Further, the ARP table updates could be set to a long time, such as four (4) hours, and this is too long to wait for a RIF update.

A second reason is that the ARP process functions independently of the prior art RIF update process, and it is not desirable to extensively modify the Layer 2 process code.

Further, any modification of Layer 2 process code must apply equally to all Layer 3 protocols. Traditionally, the MAC process code in the lower sublayer of Layer 2 of the protocol stack interprets the bits of the frame, decides that the frame is a source routed frame, decides that the frame is an ARE, ARP, ARP Explorer, etc. packet, and then transfers execution control to an ARP process (in Layer 3). The ARP process looks at the Layer 3 header and decides what to do. For example, the Layer 3 process may extract the IP address, use the IP address as an index into the ARP table, and pull out the ARP entry. The ARP process then responds to receipt of the packet by building a Layer 2 header and a Layer 3 header, and by transmitting the response on the same interface (port) from which the packet was received. Since many Layer 3 protocols are handled simultaneously by the router (IP, Apollo, Appletalk, CLNS, DECnet, IPX, XNS, Vines, etc.) it is desirable to maintain a separation between Layer 2 functions and Layer 3 functions. It is undesirable to modify this traditional action of the lower Layer processes to include tasks such as keeping track of timing for updating of "ARP table like" entries, particularly from a central RIF cache.

A third reason is that ARP Explorer request packets (and similar packets used by other Layer 3 protocols) transmitted by an end station are received by the router. When such ARP Explorer request packets are received by the router from an end station, control is passed to a process which builds a response frame, and the response frame is traditionally built by a router using a cached RIF from the RIF cache table, rather than a RIF taken from the header of the ARP Explorer request packet. Consequently, if a route goes down, the end station will not receive ARP Explorer response packets as the router will continue to use the old RIF of the route which has gone down, and which is present in the RIF cache. Again, it is undesirable to modify the code which responds to ARP Explorer packets, either request or response packets.

A fourth reason is that in some designs the ARP process in the router transmits probe request frames on a timed basis to keep the ARP table entries refreshed. The timing is adjustable by a customer who purchases a commercially sold router, and the customer may turn off transmission of probe frames. Consequently, it is possible that the router could never become sensitive to receipt of another ARP Explorer packet, either request or response, without the duplicate ignore timer. The router is again sensitive to receipt of ARP Explorer request and response frames after expiration of the duplicate ignore timer.

A fifth reason is that is desirable to separate functions into code blocks which are substantially independent of each other. When an ARP Explorer request packet arrives from an end station, the MAC process transfers control on the basis of the contents in Layer 2 field 510, and the response can then be implemented by a Layer 3 process executed in response to data transfer through the interface between Layer 2 and Layer 3. The Layer 3 process implements the duplicate ignore timer, implements transmission of an ARP Explorer request packet by the router, and otherwise performs housekeeping tasks for maintenance and use of the ARP table 900, 10,000 entry. Accordingly, process code blocks which execute other functions, such as handling a variety of different types of frames including Ethernet, SNA, IPX, etc. do not have to be extensively modified to implement the present invention.

A sixth reason follows. In prior art implementations of a central RIF cache, the router accepts only the first ARP Explorer packet, either request or response, received and then times out the entry after a short time interval, for example 15 minutes. After time out, the central RIF cache is then updated by the first received ARP Explorer packet, request or response packet, and the later received duplicate ARP Explorer packets are simply ignored. In the present invention of an extended MAC address to include the RIF information in the ARP table, the timeout interval for the RIF information is increased to the timeout interval controlled by the ARP process in the router, for example four (4) hours. Timeout of the duplicate ignore timer permits more frequent update of the RIF information in the ARP table. For example, without the duplicate ignore timer, the router would have to either wait for the ARP timeout interval (which is traditionally too long), or would have to be receptive to all ARP Explorer packets, either request or response packets. Being receptive to all ARP Explorer packets has the consequence that the last received ARP Explorer packet would provide the RIF for the route, and this would most probably be the longest and therefore the "worst" route between the two stations. The duplicate ignore timer provides a good solution to the duplicate ARP Explorer (ARE) packets, either response or request, by choosing the first received packet and then after all duplicates have arrived, making the router once again receptive to receipt of another ARP Explorer response or request packet.

ARP cache validation is further described in RFC 1122 at Section 2.3.2.1 as follows.

"An implementation of the Address Resolution Protocol (ARP) MUST provide a mechanism to flush out-of-date cache entries. If this mechanism involves a timeout, it SHOULD be possible to configure the timeout value.

A mechanism to prevent ARP flooding (repeatedly sending an ARP Request for the same IP address, at a high rate) MUST be included. The recommended maximum rate is 1 per second per destination.

Discussion:

The ARP specification suggests but does not require a timeout mechanism to invalidate cache entries when hosts change their Ethernet addresses. The prevalence of proxy ARP has significantly increased the likelihood that cache entries in hosts will become invalid, and therefore some ARP-cache invalidation mechanism is now required for hosts. Even in the absence of proxy ARP table, a long-period cache timeout is useful in order to automatically correct any bad ARP data that might have been cached.

Implementation:

Four mechanisms have been used, sometimes in combination, to flush out-of-date cache entries.

(1) Timeout—periodically time out cache entries, even if they are in use. Note that this timeout should be restarted when the cache entry is "refreshed" (by observing the source fields, regardless of target address, of an ARP broadcast from the system in question). For proxy ARP situations, the timeout needs to be on the order of a minute.

(2) Unicast Poll—Actively poll the remote host by Periodically sending a point-to-point ARP Request to it, and delete and entry if no ARP Reply is received from N successive polls. Again, the timeout should be on the order of a minute, and typically N is 2.

(3) Link-Layer Advice—If the link-layer driver detects a delivery problem, flush the corresponding ARP table cache entry.

(4) higher-layer Advice—Provide a call from the Internet layer to the link layer to indicate a delivery problem. The effect of this call would be to invalidate the corresponding cache entry. This call would be analogous to the "ADVISE_DELIVPROB( )" call from the transport layer to the Internet layer (see Section 3.4), and in fact the ADVISE_DELIVPROB routine might in turn call the link-layer advice routine to invalidate."

In an exemplary embodiment of the invention ARP entries are validated by transmission of a directed ARP request frame as a probe, or validation frame, at periodic intervals. Intervals of 15 seconds have been found satisfactory, both to keep the ARP table entry in the router up to date, and to not flood the network with too many probe frames.

Figure 12:
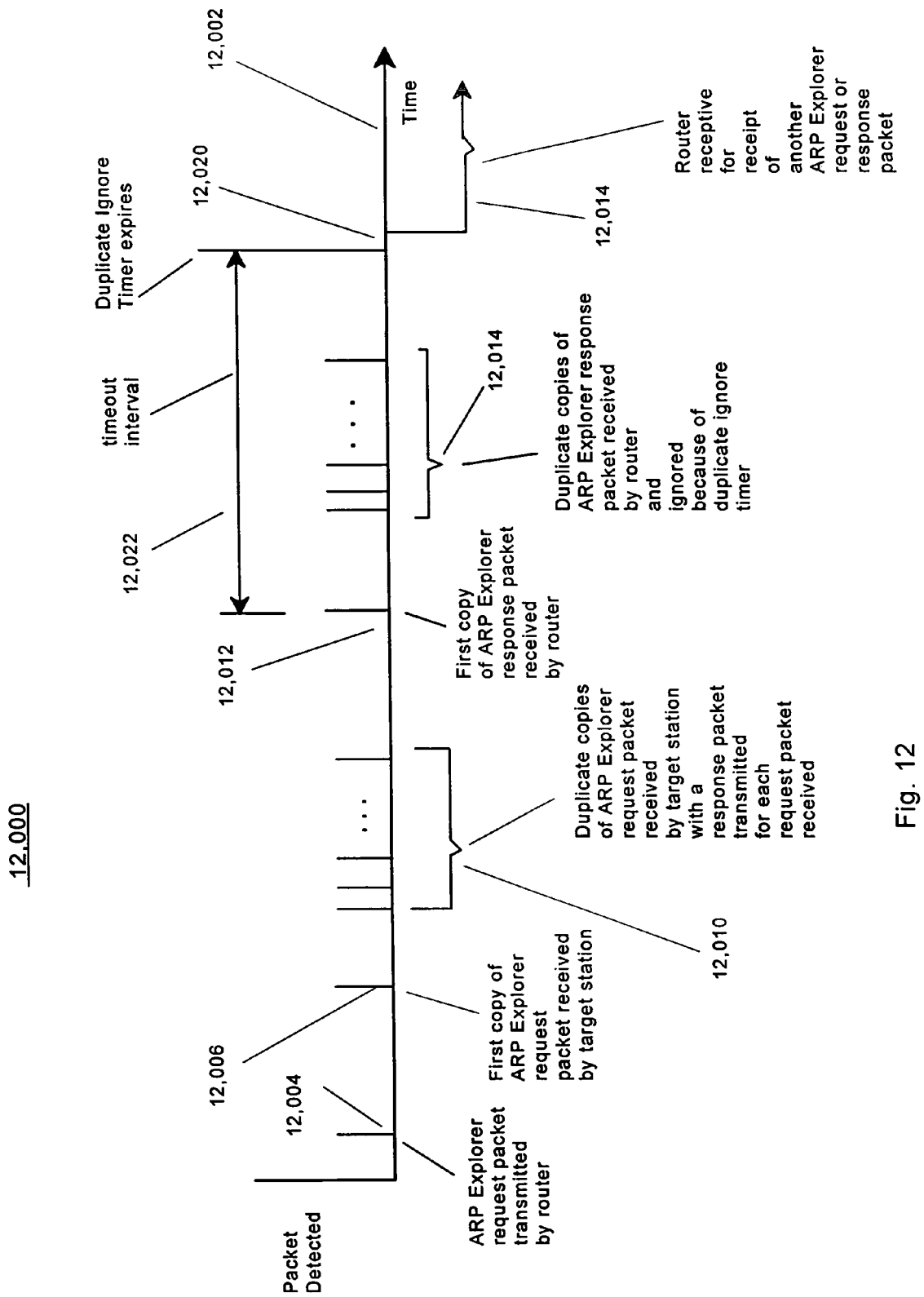
FIG. 12 is a timing diagram in accordance with the invention.

Turning now to FIG. 12, a timing diagram 12,000 for transmission of an ARP Explorer request packet by a router and receipt of multiple copies of the ARP Explorer response packet by the router are shown. Time is plotted along horizontal axis 12,002, and the occurrence of an event is noted by a vertical line. An ARP Explorer request packet is transmitted at time 12,004 by a router, initiating an ARP explorer sequence to find a route to a target station. The first copy of the ARP Explorer request packet is received by the target station at time 12,006. The target station reverses the direction bit and retransmits the packet as an ARP Explorer response packet, which is a specifically routed packet using the RIF built up during the travel of the ARP Explorer request packet. Accordingly, the ARP Explorer response packet travels back along the route over which it came, and is received by the router. Duplicate ARP Explorer request packets are received by the target station during time interval 12,010. The target station responds to receipt of each duplicate ARP Explorer request packet by transmitting an ARP Explorer response packet, with the direction bit reversed and so traveling in reverse direction along the path built up in the RIF of the corresponding ARP Explorer request packet.

The router receives the first ARP Explorer response packet at time 12,012. The RIF information carried by this first received ARP Explorer response packet is used by the router for the ARP table entry, including the RIF information to the target station. For example, in a preferred embodiment of the invention, the router 11,050 stores the RIF information from the first ARP Explorer response packet received at time 12,012 in the column 904 RIF entry in ARP table 900 (also ARP table 10,000), in the row corresponding to the target station.

The duplicate ignore timer is started at time 12,012 in response to receipt of the first ARP Explorer response packet. In a preferred embodiment of the invention, the duplicate ignore timer is "started" by the timer process reading the time (from the computer operating system) at which the first ARP Explorer response packet was received. Duplicate copies of the ARP Explorer response packet are received by the router during time interval 12,014, but are ignored because the timeout interval of the duplicate ignore timer has not expired. The duplicate ignore timer expires at time 12,020.

By use of the duplicate ignore timer, the router both receives the first ARP Explorer response packet to arrive at time 12,012, and ignores the duplicates received during time interval 12,014. The expiration time interval of the duplicate ignore timer is shown as arrow 12,022. The expiration time interval of arrow 12,022 is chosen sufficiently long so that all duplicates of the ARP Explorer response packet are expected to be received before expiration of the duplicate ignore timer. For example, as illustrated in FIG. 12, all duplicate copies are received during time interval 12,014, before time 12,020 when the duplicate ignore timer expires. In a preferred embodiment of the invention, an expiration time of two (2) minutes for the duplicate ignore timer has been found to be satisfactory.

Second Exemplary Embodiment

A router ordinarily forwards packets employing a variety of different Layer 3 protocols, with the particular protocol identified, for example, in field 510 as shown in FIG. 5. Various protocols which a router may be required to handle simultaneously comprise: IP, the Internet protocol; Apollo supported by Hewlett Packard; Appletalk supported by Apple Computer Corp.; CLNS, an abbreviation for "connectionless mode network service"; DECnet, supported by Digital Equipment Corporation; IPX and XNS supported by Novell, Inc.; Vines, supported by Banyan, Inc.; SNA, supported by IBM, but may be considered more a Layer 2 protocol; etc. Each of these protocols must recognize a Layer 2 address and a Layer 3 address for each end station, with the exception of any protocols which operate entirely in a single Layer, for example Layer 2. Accordingly, each of the protocols must maintain a table in an end station or in a router which establishes a binding between the Layer 2 address of a station and the Layer 3 address of the station. A source station, in the event that the target station is on the same subnet, has a table with the binding between the target station's Layer 3 address and Layer 2 address. However, in the event that the target station is on a different subnet from the source station, the table will have the binding between the Layer 3 address of the target station and the Layer 2 address of a router connected to the subnet of the source station.

A router maintains an address binding table for each protocol giving the binding between the Layer 3 address of a target station and the Layer 2 address needed for routing to the target station. In the event that the target station is on a subnet connected to the router, then the layer 2 address is that of the target station; and in the event that the target station is on a distant subnet, the Layer 2 address is that of another router.

Each Layer 3 protocol maintains a Layer 3 address, and the Layer 3 addresses for different protocols may be different. Also, each protocol must employ a mechanism to establish a binding between its Layer 3 address and the Layer 2 address of the stations. For example, the IP protocol, the Layer 3 part of TCP/IP, uses Internet or IP Layer 3 addresses and uses ARP and ARP Explorer packets to establish the binding between its Layer 3 addresses and the Layer 2 addresses, and to populate its binding table, the ARP table of FIG. 9 and FIG. 10. The other Layer 3 protocols may have mechanisms similar to the ARP Explorer protocol to populate their address binding tables. We refer to these mechanisms of the various Layer 3 protocols other than IP as having "ARP like" protocols, and also refer to their address binding tables as "ARP like" tables.

Duplicate Ignore Timer for any Layer 3 Protocol

In all of the Layer 3 protocols, a router which has an entry in its ARP like tables for a SRB subnet connected to the router, the Layer 2 address includes the RIF information needed for the SRB, subnet. For example, each ARP like table has entries as shown in FIG. 9 and FIG. 10 where the Layer 2 address of a target station includes both the physical (MAC) address of a station and the RIF information needed by a packet for a route from the router to the target station.

Further, in all of the Layer 3 protocols established over a SRB subnet which use an All Routes Explorer type of frame, for example such as either the ARE frame of the IEEE 802.5 token ring or the ARP Explorer packet of the IP protocol, then multiple copies of a response packet will be received by any source station that initiates the explorer protocol, as illustrated in FIG. 11. Accordingly all of the Layer 3 protocols must have a mechanism for dealing with receipt of duplicate response packets carrying different RIF information from the different routes traversed by the request packets.

Consequently, the description with reference to FIG. 12 of a single Explorer request packet being transmitted by a source station, leading to multiple request packets being received by a target destination station, and each receipt causing the target destination station to transmit a response packet to the source station describes any Layer 3 protocol. The duplicate ignore timer, also as illustrated with reference to FIG. 12, solves the problem of many routes being proposed by the various duplicate RIF values received by the source station. The first route received in the first response packet RIF field is used to update the ARP like table, the duplicate ignore timer is started, and all other responses are ignored until the timeout interval 12,022 expires. By adopting the RIF information carried by the first response packet received by the source station, the fastest route between the source station and the target station is adopted. In a preferred embodiment of the invention, the route of the first received response packet has been found satisfactory for operation of a computer network.

Third Exemplary Embodiment

It is possible to implement the duplicate ignore timer in the target end stations, and have the target end station respond to only the first received explorer request packet. The target end station then transmits a directed packet to the source station giving the RIF information to the source station. After expiration of the timeout interval, the end station is then prepared to respond to the next request packet. This mode of operation violates the present IEEE 802.5 token ring protocol which requires a station to respond to all explorer request packets, and so is not implemented today. However, implementation of the inventive duplicate ignore timer in end stations is a feasible way to solve the problem of many routes being found by an all routes explorer packet transmitted by a source station.

Hardware

Figure 13:
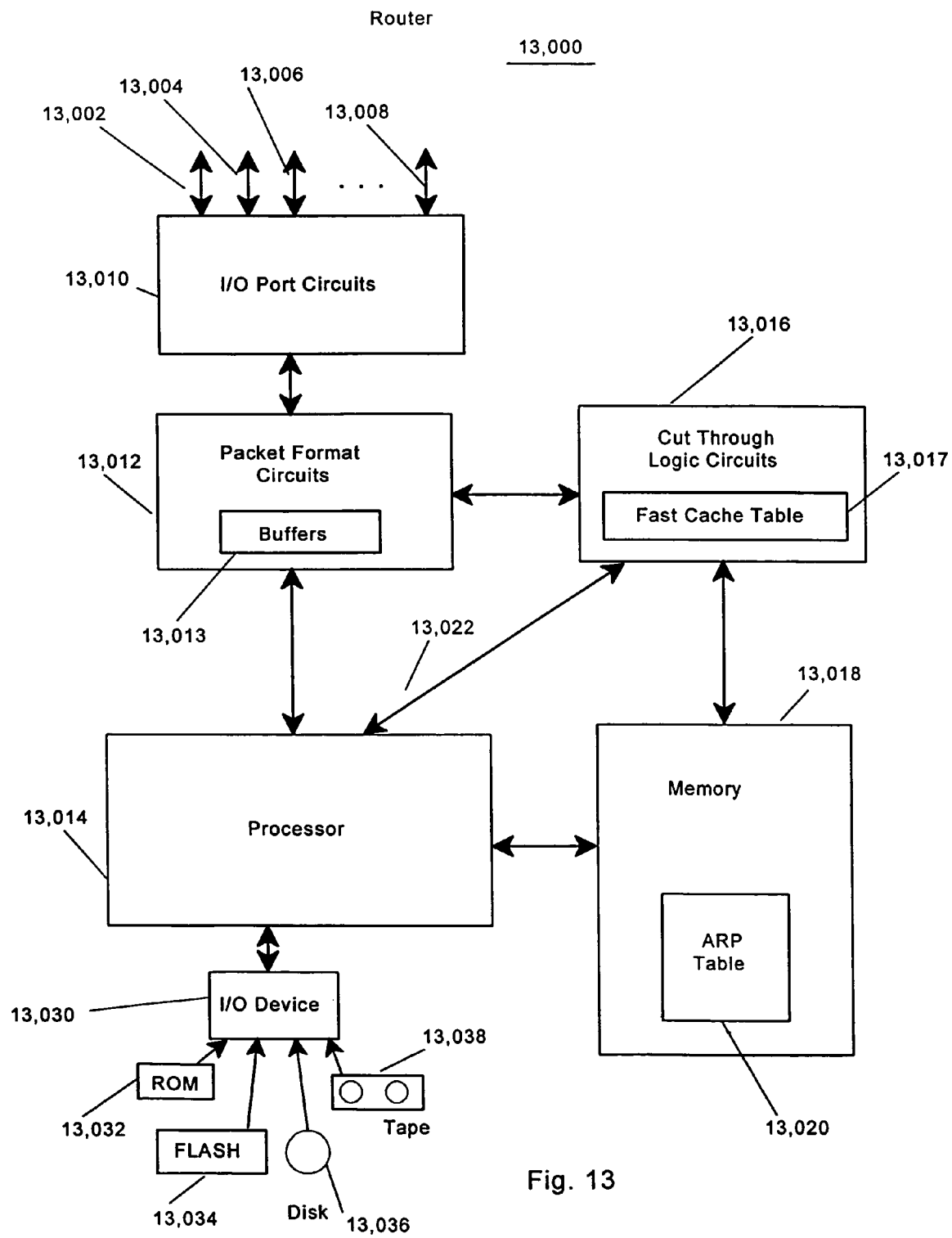
FIG. 13 is a hardware functional block diagram of a router.

Turning now to FIG. 13, a hardware functional block diagram of an exemplary router 13,000 is shown. For example, internal operation of router 130 in FIG. 1 may be represented by the hardware functional block diagram of FIG. 13. Each port 13,002, 13,004, 13,006, 13,008, etc. connects to a different LAN, a circuit to a wide area network (WAN), etc. I/O port circuits 13,010 receive packets from the ports, and transmit packets onto the ports. Packet Format Circuits 13,012 interpret data in fields of packets which are received. Packet Format Circuit block 13,012 also contains the buffers 13,013 used to temporarily store packets as they are received and before the packet is transmitted onto an output port. Processor 13,014 performs all of the router functions requiring a processor, including deciding which port a received packet should be routed to, responding to ARP Explorer packets, executing spanning tree protocol, etc. Memory 13,018 serves as random access memory for processor 13,014. Cut Through Logic Circuits 13,016 perform cut through routing to destination LANs and destination stations in order to avoid copying packet data to processor memory 13,018. ARP Table 13,020 is a data structure in memory 13,018 and holds ARP Table 900, 10,000. ARP Table 13,020 is created and maintained by processor 13,014. Processor 13,014, through connection 13,022, controls update of Cut Through Logic Circuits 13,016 with the most current ARP table entries in ARP Table 13,020. Cut Through Logic Circuits 13,016 use this information to build its fast cache table 13,017. Fast Cache Table 13,017 is held in memory located in Cut Through Logic Circuits 13,016. The Fast Cache Table 13,017 enables cut through logic circuits 13,016 to find the required output port 13,002, 13,006 . . . 13,008, etc., rewrite the Layer 2 header, and to transmit the packet without interrupting the processor.

Processor 13,014 executes computer programs to maintain ARP table 13,020, including but not limited to: transmitting ARP Explorer request packets, processing the ARP Explorer response packets transmitted by an end station in response to a request packet, responding to ARP Explorer request packets received from an end station, executing the pseudo code which implements the duplicate ignore timer, maintaining entries shown in FIG. 9 and FIG. 10 in ARP Table 13,020, etc. Processor 13,014 maintains the data needed to handle higher level protocols in all of the Layer 3 protocols for which router 13,000 is responsive.

Input-Output device (I/O device) 13,030 is a device for reading or writing to a computer readable media. I/O device 13,030 may be, for example: a ROM memory port with computer code and/or data permanently burned into the ROM; a FLASH memory port for a FLASH memory device, where the FLASH memory device holds data written into it from a download through a network port, and then semi-permanently fixed electrically so that the data remains intact after power is removed from the FLASH memory; a floppy disk drive; an optical disk drive (CD ROM drive); a magnetic tape drive, etc. Block 13,032 represents a read only memory device, ROM, of the type which has data permanently burned in during manufacture. Block 13,034 represents a FLASH memory device of the type that can have data written into by the local processor 13,014, and then the device "flashed" electrically at the command of the local processor 13,014 so that the data is semi-permanently stored in FLASH memory 13,034. Data so written into FLASH memory 13,034 persists even in the situation that electrical power is removed from FLASH memory device 13,034. Circle (disk) 13,036 represents, for example, a floppy magnetic disk media, or an optical disk (CD ROM), a 1.4 megabyte disk, a 2 gigabyte disk, etc. Block 13,038 represents a magnetic tape. Tape 13,038 may be, for example, a cartridge tape, a reel to reel tape, etc. Further, I/O device 13,030 may represent a magnetic hard drive mounted within router 13,000. In a preferred embodiment of the invention, I/O device 13,030 is coupled with both ROM memory 13,032 and FLASH memory 13,034. Data and or code can be received by router 13,000 through a network port 13,002 . . . 13,008, received by processor 13,014, and written into FLASH memory 13,034 by processor 13,014, where the stored data and code is made semi-permanent under the control of processor 13,014.

The media which can be read by I/O device 13,030 may have files transferred to memory 13,018 for execution by processor 13,014. For example, all files needed for execution the processes of the invention may be inputted to router 13,000 through I/O device 13,030. The files read by processor 13,014 for practice of the invention from I/O device 13,030 may have been transferred to FLASH memory 13,034 through a router port 13,002, 13,004, 13,006, . . . 13,008, etc., from a network connection, where the files are transmitted onto a network by a server (not shown), etc. Even though router 13,000 is shown having direct connection to Packet Format Circuits 13,012, Cut Through Logic Circuits 13,016, Memory 13,018, and I/O device 13,030, etc., the connections between these various components of router 13,000 may be through a common bus (not shown) as is standard in many computer devices.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for routing a source routed packet to a Source Route Bridge (SRB) subnet for a destination station, comprising:

maintaining an address resolution protocol table (ARP table) in a router having an entry for each station on said SRB subnet to which said router routes packets, said entry having a first field containing a Layer 3 address of said each station, said entry having a second field containing a Layer 2 address of said each station including a physical (MAC) address and Route Information Field information (RIF information) from said router to said each station; and writing said RIF information read from said second field of said ARP table into a Route Information Field (RIF) in a message packet before routing said message packet to said SRB subnet for said destination station.

2. The method as in claim 1 further comprising:

populating said RIF information in said ARP table by reading RIF information from a field of an All Routes Explorer (ARE) packet, either a request or response packet.

3. A method for routing a source routed packet to a Source Route Bridge (SRB) subnet for a destination station, comprising:

maintaining an address resolution protocol table (ARP table) in a router having an entry for each station on said SRB subnet to which said router routes packets, said entry having a first field containing a Layer 3 address of said each station, said entry having a second field containing a Layer 2 address of said each station including a physical (MAC) address and Route Information Field information (RIF information) from said router to said each station;

writing said RIF information read from said second field of said ARP table into a Route Information Field (RIF) in a message packet before routing said message packet to said SRB subnet for said destination station; and populating said RIF information in said ARP table by reading RIF information from a field of an Single Routes Explorer (SRE) packet, either a request or response packet.

4. The method as in claim 1 further comprising:

populating said RIF information in said ARP table by reading RIF information from a field of an ARP Explorer packet, either a request or response packet.

5. The method as in claim 1 further comprising: updating said second field of said ARP table when said router receives an ARP Explorer request packet from one of said stations on said SRB subnet and said request packet contains RIF information.

6. A method for routing a source routed packet to a Source Route Bridge (SRB) subnet for a destination station, comprising:

maintaining an address resolution protocol table (ARP table) in a router having an entry for each station on said SRB subnet to which said router routes packets, said entry having a first field containing a Layer 3 address of said each station, said entry having a second field containing a Layer 2 address of said each station including a physical (MAC) address and Route Information Field information (RIF information) from said router to said each station;

writing said RIF information read from said second field of said ARP table into a Route Information Field (RIF) in a message packet before routing said message packet to said SRB subnet for said destination station; and transmitting an ARP Explorer request packet upon expiration of an ARP table flush timer, and updating said second field of said ARP table in response to receipt of an ARP Explorer response packet transmitted by a station in response to said ARP Explorer request packet.

7. The method as in claim 6 further comprising: choosing a time period of four (4) hours for expiration of said ARP table flush timer.

8. A method for routing a source routed packet to a Source Route Bridge (SRB) subnet for a destination station, comprising:

maintaining an address resolution protocol table (ARP table) in a router having an entry for each station on said SRB subnet to which said router routes packets, said entry having a first field containing a Layer 3 address of said each station, said entry having a second field containing a Layer 2 address of said each station including a physical (MAC) address and Route Information Field information (RIF information) from said router to said each station;

writing said RIF information read from said second field of said ARP table into a Route Information Field (RIF) in a message packet before routing said message packet to said SRB subnet for said destination station; and transmitting a validation frame upon expiration of a validation time interval, and in the absence of a response from said validation frame, transmitting an ARP Explorer request packet, and updating said second field of said ARP table in response to receipt of an ARP Explorer response packet transmitted by a station in response to said ARP Explorer request packet.

9. The method of claim 8 further comprising: choosing a validation time interval of 15 seconds.

10. A router comprising:

an address resolution protocol table (ARP table), said ARP table maintained in said router, said ARP table having an entry for each station on a Source Route Bridge (SRB) subnet to which said router routes packets, said entry having a first field containing a Layer 3 address of said station, said entry having a second field containing a Layer 2 address of said station including a physical (MAC) address and Route Information Field information (RIF information) from said router to said each station, and;

a packet format circuit to write required RIF information read from said second field of said ARP table into a Route Information Field (RIF) in a message packet before routing said message packet to a destination station on a destination SRB subnet.

11. A router for routing a source routed packet to a Source Route Bridge (SRB) subnet for a destination station, comprising:

means for maintaining an address resolution protocol table (ARP table) in said router having an entry for each station on said SRB subnet to which said router routes packets, said entry having a first field containing a Layer 3 address of said each station, said entry having a second field containing a Layer 2 address of said each station including a physical (MAC) address and Route Information Field information (RIF information) from said router to said each station, and;

means for writing said RIF information read from said second field of said ARP table into a Route Information Field (RIF) in a message packet before routing said message packet to said SRB subnet for said destination station.

12. A computer readable device containing a computer program for performing a method of routing a source routed packet to a Source Route Bridge (SRB) subnet for a destination station, comprising:

maintaining an address resolution protocol table (ARP table) in a router having an entry for each station on said SRB subnet to which said router routes packets, said entry having a first field containing a Layer 3 address of said each station, said entry having a second field containing a Layer 2 address of said each station including a physical (MAC) address and Route Information Field information (RIF information) from said router to said each station, and;

writing said RIF information read from said second field of said ARP table into a Route Information Field (RIF) in a message packet before routing said message packet to said SRB subnet for said destination station.

13. An ARP table data structure stored in a computer memory of a router, comprising:

an entry for each station on a Source Route Bridge (SRB) subnet to which said router routes packets, said entry having a first field containing a Layer 3 address of said each station, said entry having a second field containing a Layer 2 address of said each station including a physical (MAC) address and Route Information Field information (RIF information) from said router to said each station, said RIF information in said second field of said ARP table used for writing RIF information into a Route Information Field (RIF) in a message packet before routing said message packet to said SRB subnet for said each station.

14. The ARP table of claim 1 or claim 10, or claim 11, or claim 12, or claim 13 wherein said Layer 3 address further comprises:

an address for an Internet Protocol (IP) communication session.

15. The ARP table of claim 1 or claim 10, or claim 11, or claim 12, or claim 13 wherein said Layer 3 address further comprises:

an address for an Appletalk communication session.

16. The ARP table of claim 1 or claim 10, or claim 11, or claim 12, or claim 13 wherein said Layer 3 address further comprises:

an address for a connectionless mode network service communication session.

17. The ARP table of claim 1 or claim 10, or claim 11, or claim 12, or claim 13 wherein said Layer 3 address further comprises:

an address for a DECnet communication session.

18. The ARP table of claim 1 or claim 10, or claim 11, or claim 12, or claim 13 wherein said Layer 3 address further comprises:

an address for an IPX communication session.

19. The ARP table of claim 1 or claim 10, or claim 11, or claim 12, or claim 13 wherein said Layer 3 address further comprises:

an address for a XNS communication session.

20. The ARP table of claim 1 or claim 10, or claim 11, or claim 12, or claim 13 wherein said Layer 3 address further comprises:

an address for a Vines communication session.

21. The method of claim 1 or claim 12, further comprising:

receiving data by a processor, said data received from a network connection for maintaining said ARP table, and storing said data in a FLASH memory.

22. The router of claim 10 or claim 11, or claim 13, further comprising:

a processor to receive data from a network connection, said data received from a network connection for maintaining said ARP table, and to store said data in a FLASH memory.

* * * * *

UNITED STATES PATENT AND TRADEMARK OFFICE
CERTIFICATE OF CORRECTION

| | | |
|---|---|---|
| PATENT NO. | : 7,474,660 B1 | |
| APPLICATION NO. | : 09/283125 | |
| DATED | : January 6, 2009 | |
| INVENTOR(S) | : Bernie Paul Pearce | |

It is certified that error appears in the above-identified patent and that said Letters Patent is hereby corrected as shown below:

Title Page;

In the Abstract (57), please amend as shown:

The invention solves the problem of maintaining Route ~~information~~ Information Field (RIF) information in a router for populating the RIF field of packets routed by the router, by storing the RIF information with the Layer 2 address in the address binding table. The address binding table establishes a binding between a Layer 2 address and a Layer 3 address of a station. The Layer 2 address in the address binding table is extended to include the RIF information. The address binding table is normally maintained in the router in an architecture which permits rapid access for fast switching such as cut through routing. A separate RIF cache table, requiring a separate time consuming table look-up is thereby avoided. The address binding table is referred to as the Address Resolution Protocol (ARP) Table in IP protocol. The Layer 2 address is extended to include both MAC address and ~~REF~~ RIF information. The RIF information in the Layer 2 field of the ARP table is updated in response to execution of an ARP Explorer protocol by the router. RIF information is read from an ARP Explorer response packet and written into the Layer 2 field of the ARP table. The Layer 2 address, both MAC address and RIF information, is read from the ARP table for use in populating both the destination address field and the RIF field of a routed packet.

Signed and Sealed this
Seventh Day of June, 2011

David J. Kappos
*Director of the United States Patent and Trademark Office*